(12) United States Patent
Yamamoto et al.

(10) Patent No.: US 10,967,461 B2
(45) Date of Patent: Apr. 6, 2021

(54) INDUCTION HEATING COIL

(71) Applicant: Koyo Thermo Systems Co., Ltd., Nara (JP)

(72) Inventors: Ryosuke Yamamoto, Tenri (JP); Ayaka Nakata, Tenri (JP); Norihide Fujiyama, Tenri (JP)

(73) Assignee: Koyo Thermo Systems Co., Ltd., Nara (JP)

( * ) Notice: Subject to any disclaimer, the term of this patent is extended or adjusted under 35 U.S.C. 154(b) by 203 days.

(21) Appl. No.: 16/122,512

(22) Filed: Sep. 5, 2018

(65) Prior Publication Data

US 2019/0001439 A1  Jan. 3, 2019

Related U.S. Application Data

(63) Continuation of application No. 14/702,510, filed on May 1, 2015, now Pat. No. 10,376,990.

(30) Foreign Application Priority Data

May 12, 2014  (JP) .................................. 2014-098906

(51) Int. Cl.
*B23K 26/34* (2014.01)
*H05B 6/04* (2006.01)
(Continued)

(52) U.S. Cl.
CPC ............ *B23K 26/34* (2013.01); *B23K 26/342* (2015.10); *B23K 26/346* (2015.10); *H05B 6/04* (2013.01);
(Continued)

(58) Field of Classification Search
CPC .... B23K 26/34; B23K 26/342; B23K 26/346; B33Y 10/00; B33Y 80/00; H05B 6/04; H05B 6/42
See application file for complete search history.

(56) References Cited

U.S. PATENT DOCUMENTS

| | | | |
|---|---|---|---|
| 3,060,067 | A | 10/1962 | Kennedy, Jr. |
| 4,698,473 | A | 10/1987 | Alcini et al. |

(Continued)

FOREIGN PATENT DOCUMENTS

| | | | |
|---|---|---|---|
| JP | H03-171586 A | 7/1991 | |
| JP | H05-094989 U | 12/1993 | |

(Continued)

OTHER PUBLICATIONS

Haraguchi (JP 03171586 A), machine translation, 4 pages (Year: 1991).*

(Continued)

*Primary Examiner* — Dana Ross
*Assistant Examiner* — James F Sims, III
(74) *Attorney, Agent, or Firm* — Studebaker & Brackett PC

(57) ABSTRACT

An induction heating coil includes a coil section configured to heat a treatment target by induction, a power supply section configured to supply power to the coil section, and a cooling medium passage that is arranged in the power supply section and the coil section, and is configured to supply a cooling medium to the coil section. The coil section, the power supply section, and the cooling medium passage are formed using a metal additive fabrication method.

8 Claims, 19 Drawing Sheets

(51) Int. Cl.
*H05B 6/42* (2006.01)
*B23K 26/342* (2014.01)
*B23K 26/346* (2014.01)
*B33Y 10/00* (2015.01)
*B33Y 80/00* (2015.01)

(52) U.S. Cl.
CPC ............... *H05B 6/42* (2013.01); *B33Y 10/00* (2014.12); *B33Y 80/00* (2014.12)

(56) References Cited

U.S. PATENT DOCUMENTS

| | | |
|---|---|---|
| 4,855,556 A | 8/1989 | Mucha et al. |
| 5,410,134 A | 4/1995 | Marcut et al. |
| 2014/0291886 A1 | 10/2014 | Mark et al. |

FOREIGN PATENT DOCUMENTS

| | | |
|---|---|---|
| JP | H11-185950 A | 7/1999 |
| JP | 2002-066844 A | 3/2002 |
| JP | 2003-213326 A | 7/2003 |
| JP | 2004-149826 A | 5/2004 |
| JP | 2010-100884 A | 5/2010 |
| JP | 2010-108896 A | 5/2010 |
| JP | 2010-113937 A | 5/2010 |
| JP | 2011-047037 A | 3/2011 |
| JP | 2013-081327 A | 5/2013 |
| JP | 2013-136819 A | 7/2013 |
| JP | 2013-194263 A | 9/2013 |
| JP | 2015-216051 A | 12/2015 |

OTHER PUBLICATIONS

An Office Action mailed by the Japanese Patent Office dated Sep. 11, 2018, which corresponds to Japanese Patent Application No. 2017-174009 and is related to U.S. Appl. No. 16/122,512; with English translation.
An Office Action mailed by the Japanese Patent Office dated Sep. 11, 2018, which corresponds to Japanese Patent Application No. 2017-174008 and is related to U.S. Appl. No. 16/122,512; with English translation.
An Office Action mailed by the Japanese Patent Office dated Sep. 11, 2018, which corresponds to Japanese Patent Application No. 2017-174006 and is related to U.S. Appl. No. 16/122,512; with English translation.
An Office Action mailed by the Japanese Patent Office dated Jan. 8, 2019, which corresponds to Japanese Patent Application No. 2017-173999 and is related to U.S. Appl. No. 16/122,512; with English translation.
An Office Action mailed by the Japanese Patent Office dated Sep. 11, 2018, which corresponds to Japanese Patent Application No. 2017-173999 and is related to U.S. Appl. No. 16/122,512; with English translation.
An Office Action mailed by the United States Patent and Trademark Office dated Feb. 19, 2019, which corresponds to U.S. Appl. No. 16/034,220 and is related to U.S. Appl. No. 16/122,512.
An Office Action issued by the Japanese Patent Office dated Mar. 19, 2019, which corresponds to Japanese Patent Application No. 2017-174009 and is related to U.S. Appl. No. 16/122,512; with English translation.
JP Office Action dated Jul. 12, 2017, from corresponding JP Appl No. 2014-098906, with English translation, 6 pages.
Office Action issued in JP 2017-174009, mailed by the Japanese Patent Office dated May 12, 2020; which corresponds to U.S. Appl. No. 16/122,512.

* cited by examiner

Induction heating coil manufacturing process

Additive fabrication process

INDUCTION HEATING COIL

CROSS-REFERENCE TO RELATED APPLICATIONS

This application is a divisional of U.S. patent application Ser. No. 14/702,510, which claims priority to Japanese Patent Application No. 2014-98906. The entire disclosures of U.S. patent application Ser. No. 14/702,510 and Japanese Patent Application No. 2014-98906 are hereby incorporated herein by reference.

BACKGROUND OF THE INVENTION

1. Field of the Invention

The present invention relates to an induction heating coil.

2. Description of Related Art

An induction heating coil may be used in order to, for example, subject metal machine parts such as a shaft to a heat treatment by high frequency induction heating (see JP 2013-136819A, for example). An induction heating coil disclosed in JP 2013-136819A includes a circular ring-shaped coil section which is constituted to surround a shaft serving as a treatment target. A large current is supplied to the coil section to operate it to carry out the induction heating.

This high electrical current is supplied to the coil section via, for example, a metal member (power supply section) that is brazed on the coil section. Furthermore, the coil section is cooled because its temperature increases. For preventing the temperature increased, a cooling water passage is provided in the inside of the power supply section and the inside of the coil section.

Cooling water reaches the inside of the coil section through the inside of the power supply section, and cools the coil section. The cooling water that has passed through the coil section is returned through the inside of the power supply section.

SUMMARY OF THE INVENTION

A coil section is formed in a cylindrical shape with thin shell as a whole, and the inside of this cylindrical portion is a hollow space for cooling water there in. Accordingly, the coil section has a complicated shape, and it is difficult to make the coil section from a single member. The coil section is thus formed in a shape having a hollow space by brazing a plurality of members. Also, this coil section is brazed in the state of abutting against an end portion in the longitudinal direction of the circumferential portion surrounding the cooling water passage of the power supply section. Accordingly, the coil section is fixed to the power supply section.

In order to perform a brazing operation with accuracy, however, proficient skill is needed. And the accuracy in brazing of a plurality of members constituting the coil section, and brazing between the coil section and the power supply section tends to vary widely. Accordingly, the brazing accuracy is largely influenced by the skills of the operator who performs brazing. As a result, it is difficult to keep the brazing accuracy constant for each induction heating coil, and also difficult to make the induction heating coils in mass production with them formed in same (uniform) dimensions or shapes each other.

Furthermore, when the plurality of members constituting the coil section are brazed to each other, and when the coil section and the power supply section are brazed to each other, the brazing temperature is high, and thus heat strain inevitably occurs between the plurality of members constituting the coil section and between the coil section and the power supply section. Accordingly, a special jig is needed for lowering such heat strain, when brazing is performed on the coil section and the power supply section. Design of this jig as well requires a high level intuition and experience for lowering heat strain in the coil section and the power supply section.

Furthermore, when brazing is performed on the coil section and the power supply section, it takes not only time for setting the above-described jig but also a lot of troublesome works to prepare the jig, resulting in a lowered efficiency of producing the induction heating coils. Moreover, processes of brazing and machining the induction heating coil are low in their flexibility to set their conditions. This will reduce the scope of conditions in setting the shape of the induction heating coil for achieving the heat treatment most appropriate for a treatment target subjected to the treatment. Furthermore, since the brazed section has a larger electrical resistivity than that of other parts of the coil section, the brazed section is likely to generate heat, largely expands and shrinks, and is likely to be subjected to fatigue failure. Accordingly, the lifetime (occurrence of crack or breaking) of the brazed section becomes the lifetime of the induction heating coil. Therefore, design of the brazed section requires further intuition and experience.

In view of the above-described circumstances, it is an object of the present invention to provide an induction heating coil.

Furthermore, it is another object of the present invention to manufacture the induction heating coil more easily and with higher accuracy, further improving the efficiency of producing the induction heating coil.

(1) In order to solve the above-described problem, an induction heating coil according to an aspect of the present invention includes: a coil section configured to heat a treatment target by induction; a power supply section configured to supply power to the coil section; and a cooling medium passage that is arranged in the power supply section and the coil section, and is configured to supply a cooling medium to the coil section, wherein the coil section, the power supply section, and the cooling medium passage are formed using a metal additive fabrication method.

According to this configuration, the cooling medium passage in the coil section and the power supply section is formed using a metal additive fabrication method. In the metal additive fabrication method, it is possible to form any three-dimensional shape by repeatedly performing an operation in which a powder metal layer is selectively heated and melted, and then this melted metal is allowed to harden. Therefore, even when the cooling medium passage formed in the coil section and the power supply section has a complicated shape, it is possible to form the coil section and the power supply section as a single member of unified structure. Accordingly, no brazed section needs to be provided either on the coil section itself or between the power supply section and the coil section. This eliminates the need for a brazing operation that requires proficiency. Furthermore, the metal additive fabrication method enables mass production of uniformly-shaped induction heating coils with high mechanical accuracy. It is thus possible to mass-produce induction heating coils with uniform dimensions.

Moreover, since the formation of the coil section itself does not need brazing, and also the coil section and the power supply section do not need to be brazed, heat strain that is caused by a brazing operation does not occur in the coil section itself and does not occur between the power supply section and the heating coil section. Therefore, no special jig for lowering such heat strain is needed, making it possible to manufacture the induction heating coil more easily.

Furthermore, since an operation for setting the above-described jig for brazing is not needed, it is possible to raise the efficiency of producing the induction heating coil. Moreover, when the metal additive fabrication method is used, the flexibility in setting the shape is high. This can achieve a high flexibility in setting the shape of the induction heating coil for achieving the heat treatment most appropriate for a treatment target subjected to the treatment. Furthermore, since a brazed section, in which electrical resistance is discontinuous, is not needed, it is possible to reduce imbalance in heat stress in the coil section and a connection section at which the power supply section and the coil section are connected to each other. Accordingly, the lifetime of the induction heating coil can further be extended.

Therefore, according to the above-described configuration, it is possible to manufacture the induction heating coil so as to have a longer lifetime. It is furthermore possible to manufacture the induction heating coil more easily and with higher accuracy, and to further improve the efficiency for producing the induction heating coil.

(2) It is preferable that a support section configured to support a predetermined portion of the induction heating coil is formed when the induction heating coil is formed by the metal additive fabrication method, and the induction heating coil has a post-removal section that remains after the support section has been removed.

According to this configuration, the support section can be used for preventing, for example, the coil section serving as a predetermined portion and a projection projecting from the power supply section, from causing positional aberration such as sinking of the coil section into the metal powder layer due to its own weight, during fabrication by the metal additive fabrication method. Accordingly, it is possible to improve the dimensional accuracy of the induction heating coil. The induction heating coil formed with such a support section will have a post-removal section.

(3) It is more preferable that the coil section has a height that is smaller than that of the power supply section, and is formed in a shape projecting from the power supply section, and the support section is formed so as to support the coil section that serves as the predetermined portion when the induction heating coil is formed by the metal additive fabrication method.

According to this configuration, the induction heating coil having the thin coil section can be formed with accuracy.

(4) It is preferable that the cooling medium passage includes a power supply section side passage formed in the power supply section, and a coil section side passage formed in the coil section, and a connection section at which the power supply section side passage and the coil section side passage are connected to each other has a cross-sectional area that changes continuously in the traveling direction of the cooling medium.

Ordinarily, the shape of the connection section at which the power supply section and the coil section are connected to each other changes largely, and heat stress is likely to increase locally in the connection section. In the periphery of this connection section, the shape of the cooling medium passage changes continuously. Accordingly, it is possible to suppress imbalance in heat stress in the connection section. It is thus possible to further extend the lifetime of the induction heating coil.

(5) It is preferable that the cooling medium passage includes a coil section side passage formed in the coil section, the coil section side passage has a rising and falling section, and the rising and falling section extends in the circumferential direction of the coil section while rising and falling in the thickness direction of the coil section.

According to this configuration, a larger contact area between the coil section and the cooling medium can be ensured. Accordingly, it is possible to absorb the heat generated by the coil section by the cooling medium more efficiently, making it possible to more reliably suppress imbalance in heat stress due to overheating of the coil section. The ease of manufacturing of the induction heating coil including the cooling medium passage having such a complicated three-dimensional shape will become significant by the use of the additive fabrication method.

(6) It is preferable that the induction heating coil further includes a second cooling medium passage and a spray nozzle through which a treatment target cooling medium for cooling the treatment target that was induction-heated by the coil section passes, wherein the second cooling medium passage and the spray nozzle are formed using the metal additive fabrication method, the spray nozzle is connected to the second cooling medium passage, and the spray nozzle is open toward portions where the coil section is opposite to the treatment target during the heat treatment of the treatment target, and is capable of spraying the treatment target cooling medium onto the treatment target.

According to this configuration, it is possible to cool the treatment target that was induction-heated by the coil section by the treatment target cooling medium. Accordingly, the ease of manufacturing of the induction heating coil including the second cooling medium passage in addition to the cooling medium passage will become significant by the use of the additive fabrication method.

(7) In order to solve the above-described problem, a method for manufacturing an induction heating coil according to an aspect of the present invention includes a metal additive fabrication step of forming, using a metal additive fabrication method, a coil section configured to heat a treatment target by induction, a power supply section configured to supply power to the coil section, and a cooling medium passage that is arranged in the power supply section and the coil section, and is configured to supply a cooling medium to the coil section.

According to this configuration, the cooling medium passage in the coil section and the power supply section is formed using the metal additive fabrication method. In the metal additive fabrication method, it is possible to form any three-dimensional shape by repeatedly performing an operation in which a powder metal layer is selectively heated and melted, and then this melted metal is allowed to harden. Therefore, even when the cooling medium passage formed in the coil section and the power supply section has a complicated shape, it is possible to form the coil section and the power supply section as a single member of unified structure. Accordingly, no brazed section needs to be provided either on the coil section itself or between the power supply section and the coil section. This eliminates the need for a brazing operation that requires proficiency. Furthermore, the metal additive fabrication method enables mass production of uniformly-shaped induction heating coils with high mechanical accuracy. It is thus possible to mass-produce induction heating coils with uniform dimensions.

Moreover, since the formation of the coil section itself does not need brazing, and also the coil section and the power supply section do not need to be brazed, heat strain that is caused by a brazing operation does not occur in the coil section itself and does not occur between the power supply section and the heating coil section. Therefore, no special jig for lowering such heat strain is needed, making it possible to produce the induction heating coil more easily.

Furthermore, since an operation for setting the above-described jig for brazing is not needed, it is possible to raise the efficiency of producing the induction heating coil. Moreover, when the metal additive fabrication method is used, the flexibility in setting the shape is high. This can achieve a high flexibility in setting the shape of the induction heating coil for achieving the heat treatment most appropriate for a treatment target subjected to the treatment. Furthermore, since a brazed section, in which electrical resistance is discontinuous, is not needed, it is possible to reduce imbalance in heat stress in the coil section and the connection section at which the power supply section and the coil section are connected to each other. Accordingly, the lifetime of the induction heating coil can further be extended.

Therefore, according to the above-described configuration, it is possible to manufacture the induction heating coil so as to have a longer lifetime. It is furthermore possible to manufacture the induction heating coil more easily and with higher accuracy, and to further improve the efficiency for producing the induction heating coil.

(8) It is preferable that the metal additive fabrication step forms a support section configured to support a predetermined portion of the induction heating coil, and the method further includes a removal step of removing the support section.

According to this configuration, the support section can be used for preventing, for example, the coil section serving as a predetermined portion and a projection projecting from the power supply section, from causing positional aberration such as sinking of the coil section into the metal powder layer due to its own weight, during fabrication by the metal additive fabrication method. Accordingly, it is possible to improve the dimensional accuracy of the induction heating coil.

(9) In order to solve the above-described problem, an induction heating coil according to an aspect of the present invention includes: a coil section configure to heat a treatment target by induction; a power supply section configured to supply power to the coil section; and a cooling medium passage that is arranged in the power supply section and the coil section, and is configured to supply a cooling medium to the coil section, wherein the coil section, the power supply section, and the cooling medium passage are formed in one piece using a single member of unified structure.

According to this configuration, no brazed section needs to be provided either on the coil section itself or between the power supply section and the coil section. Accordingly, heat strain that is caused by a brazing operation does not occur between the power supply section and the heating coil section. Therefore, no special jig for lowering such heat strain is needed, making it possible to produce the induction heating coil more easily. Furthermore, since an operation for setting the above-described jig for brazing is not needed, it is possible to raise the efficiency of producing the induction heating coil. Furthermore, since a brazed section, in which electrical resistance is discontinuous, is not needed, it is possible to reduce imbalance in heat stress in the coil section and the connection section at which the power supply section and the coil section are connected to each other. Accordingly, the lifetime of the induction heating coil can further be extended.

According to the above-described configuration, it is thus possible to manufacture the induction heating coil so as to have a longer lifetime.

(10) In order to solve the above-described problem, an induction heating coil according to an aspect of the present invention includes: a coil section configured to heat a treatment target by induction; a power supply section configured to supply power to the coil section; and a cooling medium passage that is arranged in the power supply section and the coil section, and is configured to form a void through which a cooling medium is supplied to the coil section, wherein the coil section is formed in one piece of unified structure from the same electrically-conductive metal material, the coil section does not have a brazed configuration at any position thereof and variation in electrical resistivity of the metal material per unit volume ($mm^3$) is 5% or less.

According to this configuration, no brazed section is provided in the coil section. Therefore, heat strain that is caused by a brazing operation does not occur in the coil section. Accordingly, since a brazed section, in which electrical resistance is discontinuous, is not needed, it is possible to reduce imbalance in heat stress in the coil section. Accordingly, the lifetime of the induction heating coil can further be extended. Furthermore, the coil section is formed in one piece of unified structure from the same electrically-conductive metal material. Therefore, as compared with the conventional coil section that is formed by brazing to combine a plurality of pieces which are made from different kind of metal materials respectively, variation in electrical resistivity per unit volume in the entire region of the coil section is small. Furthermore, variation in electrical resistivity ($\Omega \cdot m$) per unit volume (1 $mm^3$) in the entire region of the coil section is 5% or less. Therefore, there is not likely to be a difference in the variation in expansion and shrinkage amount of the coil section when the coil section expands and shrinks due to heat. Accordingly, fatigue failure in the coil section can be prevented, and the extension of the lifetime of the coil section can further extend the lifetime of the induction heating coil.

According to the above-described configuration, it is thus possible to manufacture the induction heating coil so as to have a longer lifetime.

(11) It is more preferable that the coil section and the power supply section are formed in one piece of unified structure from the same metal material, the coil section and the power supply section do not have a brazed configuration at any position thereof, and a variation in electrical resistivity of the metal material per unit volume ($mm^3$) is 5% or less.

According to this configuration, no brazed section is provided in the coil section and the power supply section. No brazed section is thus provided in the connection section at which the coil section and the power supply section are connected to each other either. Accordingly, heat strain that is caused by a brazing operation does not occur in the coil section and the power supply section. Accordingly, since a brazed section, in which electrical resistance is discontinuous, is not needed, it is possible to reduce imbalance in heat stress in the coil section and the power supply section. Accordingly, the lifetime of the induction heating coil can further be extended. Furthermore, the coil section and the power supply section are formed in one piece of unified structure from the same electrically-conductive metal material. Therefore, as compared with the conventional coil section and power supply section that are formed by brazing to combine a plurality of pieces which are made from different kind of metal materials respectively, variation in electrical resistivity per unit volume in the entire region of the coil section and the power supply section is small. Furthermore, variation in electrical resistivity (Ω·m) per unit volume (1 mm$^3$) in the entire region of the coil section and the power supply section is 5% or less. Therefore, there is not likely to be a difference in the variation in expansion and shrinkage amount of the coil section and the power supply section in case of the expansion or shrinkage caused on the sections under thermally-stressed conditions. Accordingly, fatigue failure in the coil section and the power supply section can be prevented, and the extension of the lifetime of the coil section and the power supply section can further extend the lifetime of the induction heating coil.

Note that the foregoing and other objects, features, and advantages of the present invention will become apparent by reading the description below with reference to the accompanying drawings.

DETAILED DESCRIPTION OF THE INVENTION

Hereinafter, embodiments for implementing the present invention will be described with reference to the drawings.

First Embodiment

Figure 1:
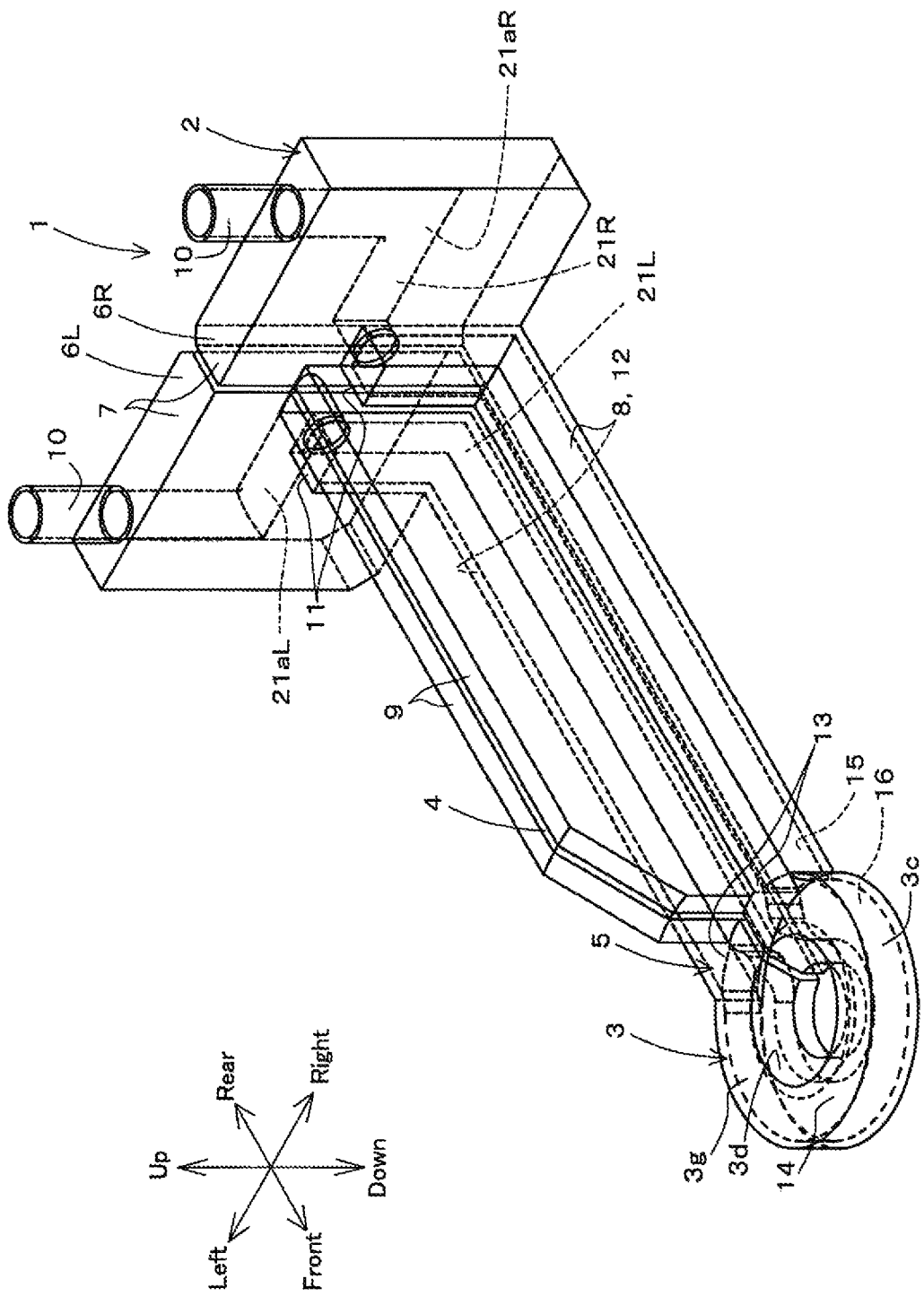
FIG. 1 is a perspective view of an induction heating coil according to a first embodiment of the present invention.
Figure 2:
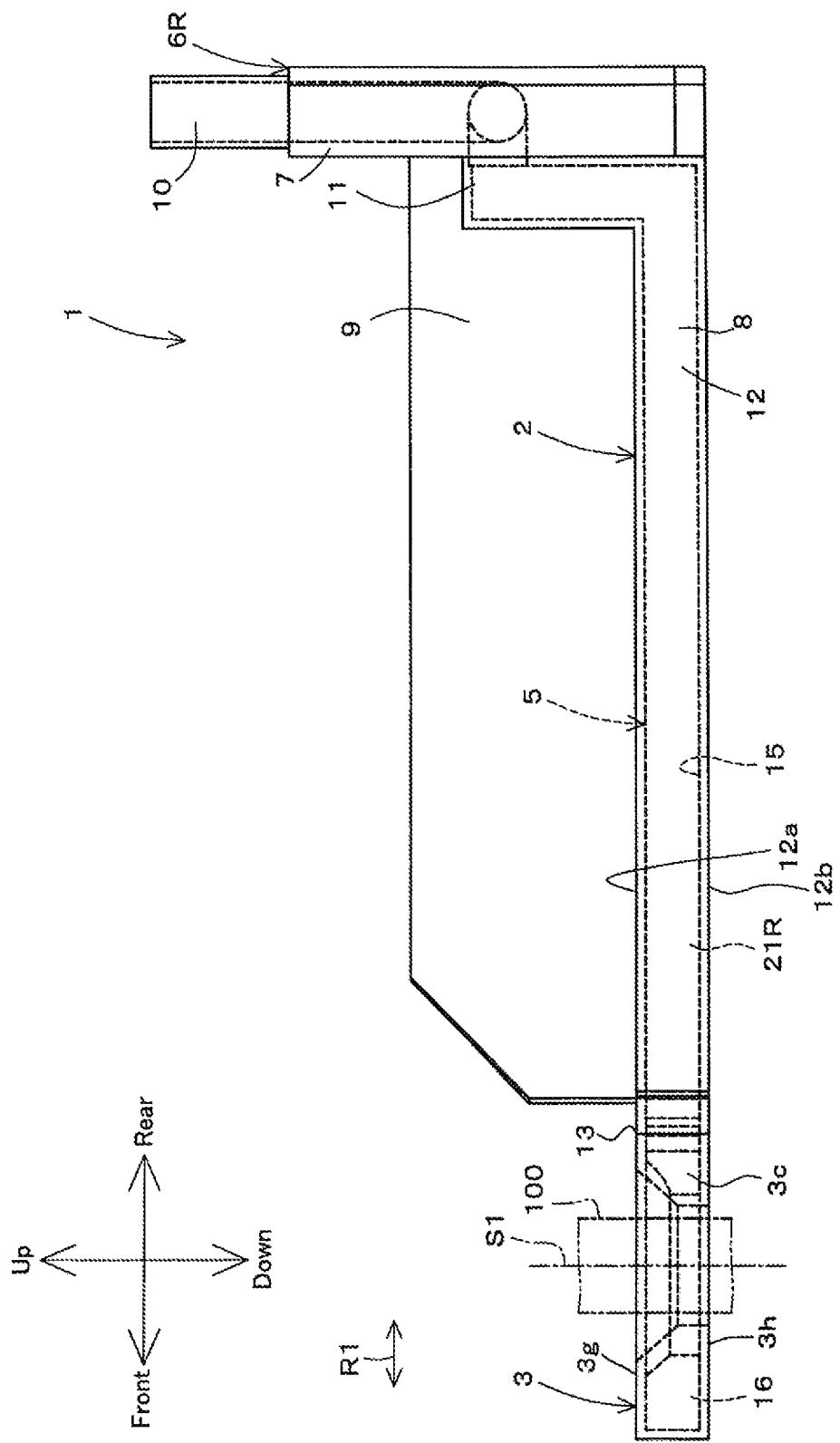
FIG. 2 is a side view of the induction heating coil.
Figure 3:
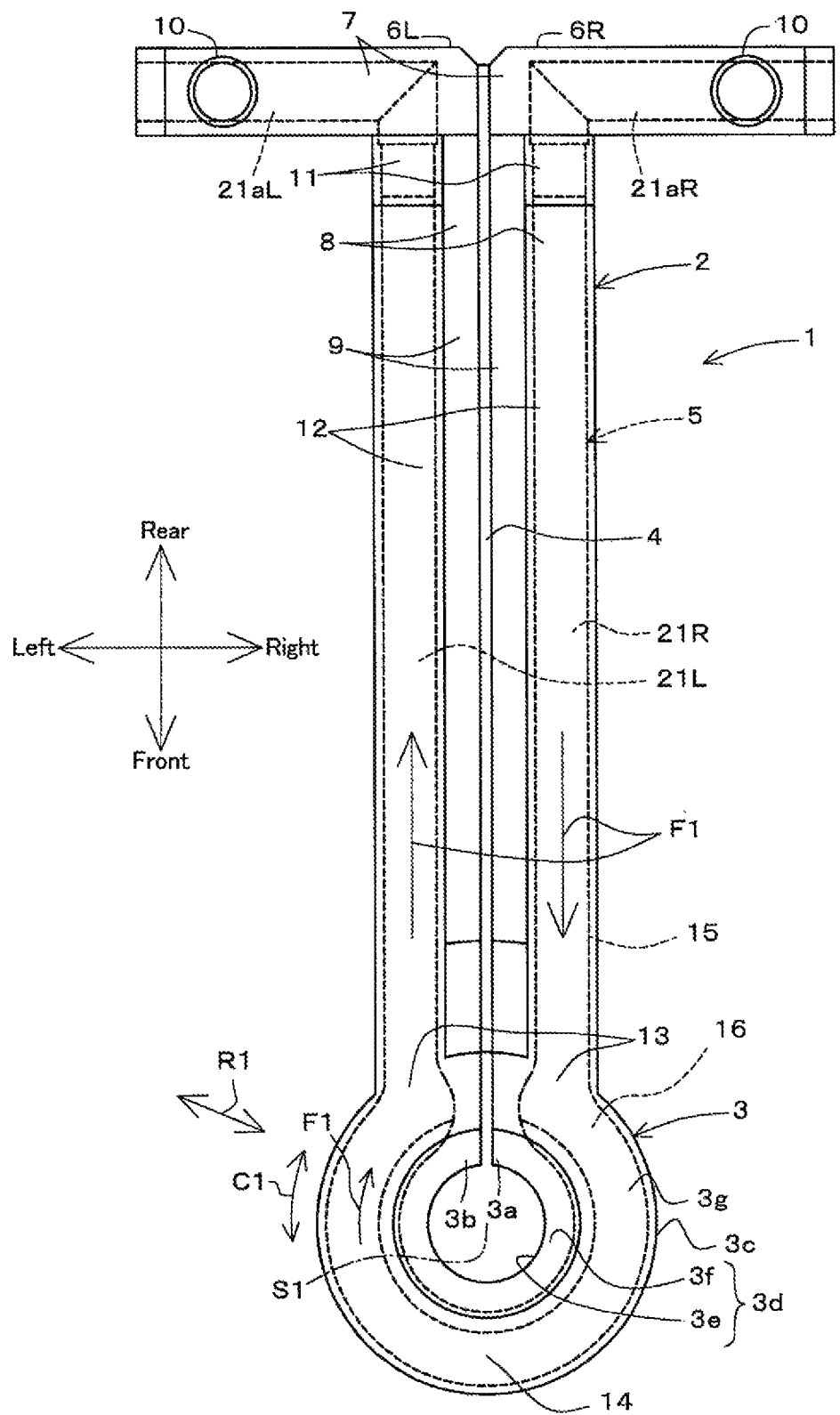
FIG. 3 is a plan view of the induction heating coil.
Figure 4:
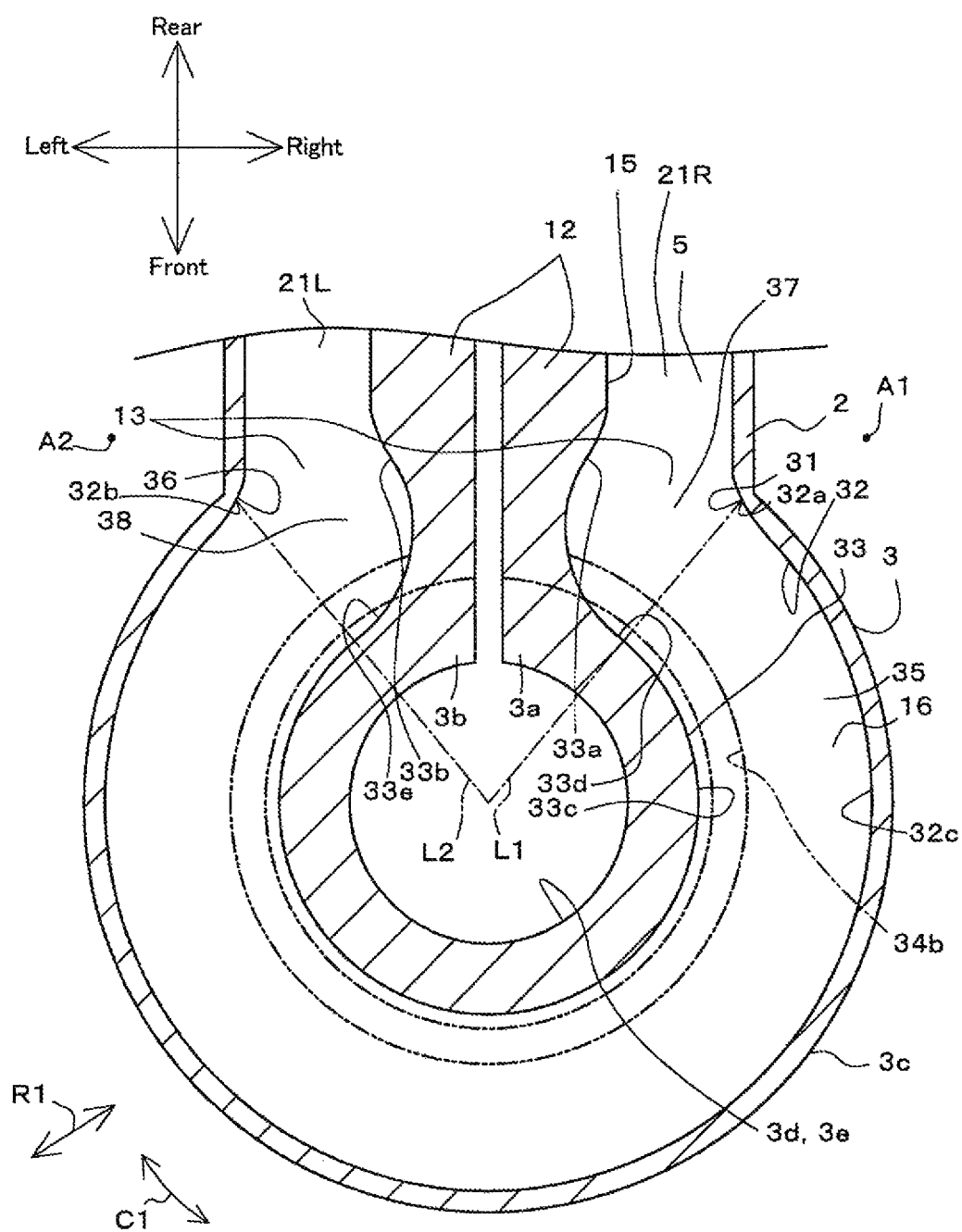
FIG. 4 is a cross-sectional view of the state in which the periphery of a coil section of the induction heating coil is viewed in a plan view.
Figure 5:
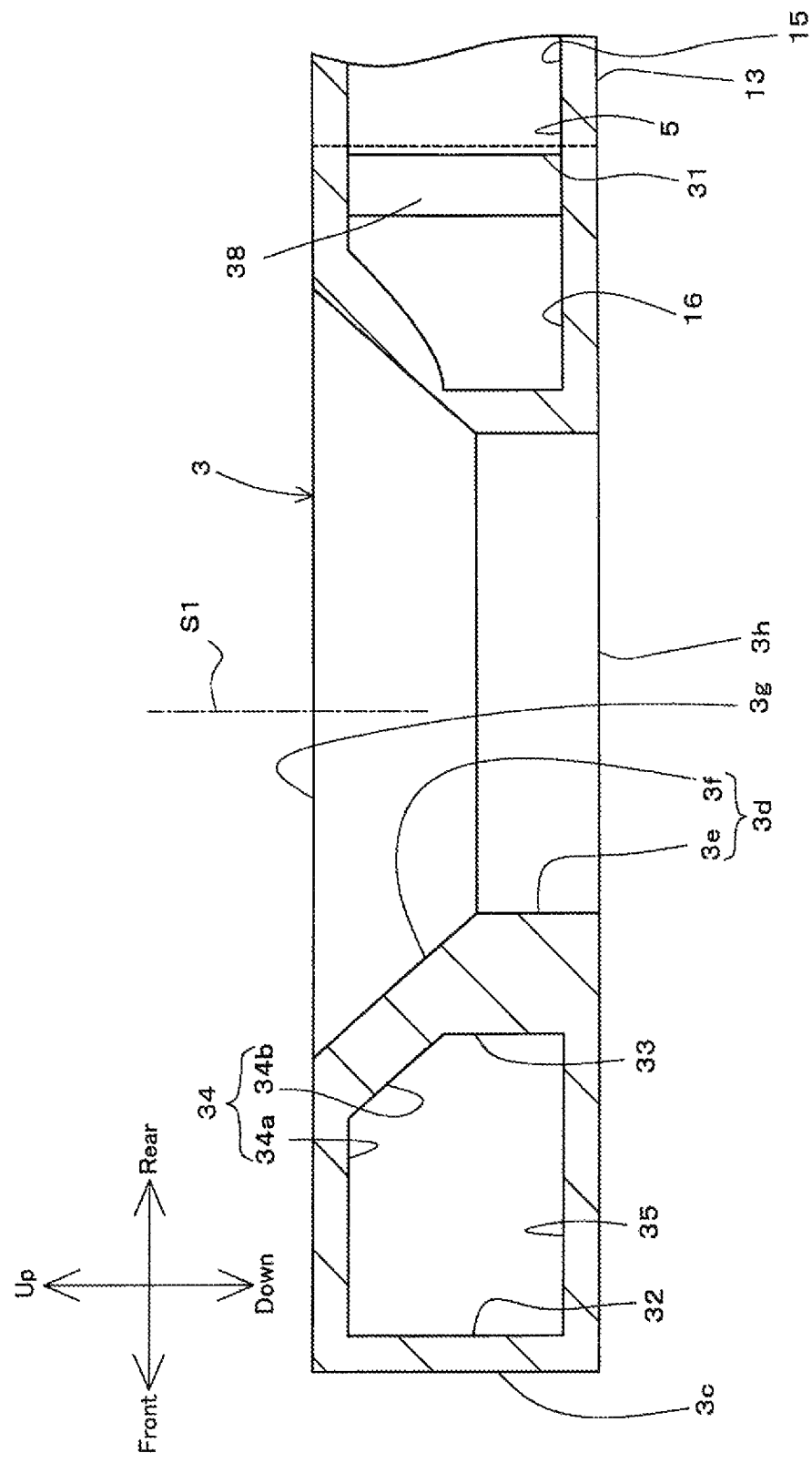
FIG. 5 is a cross-sectional view of the state in which the periphery of the coil section is viewed in a side view.
Figure 6:
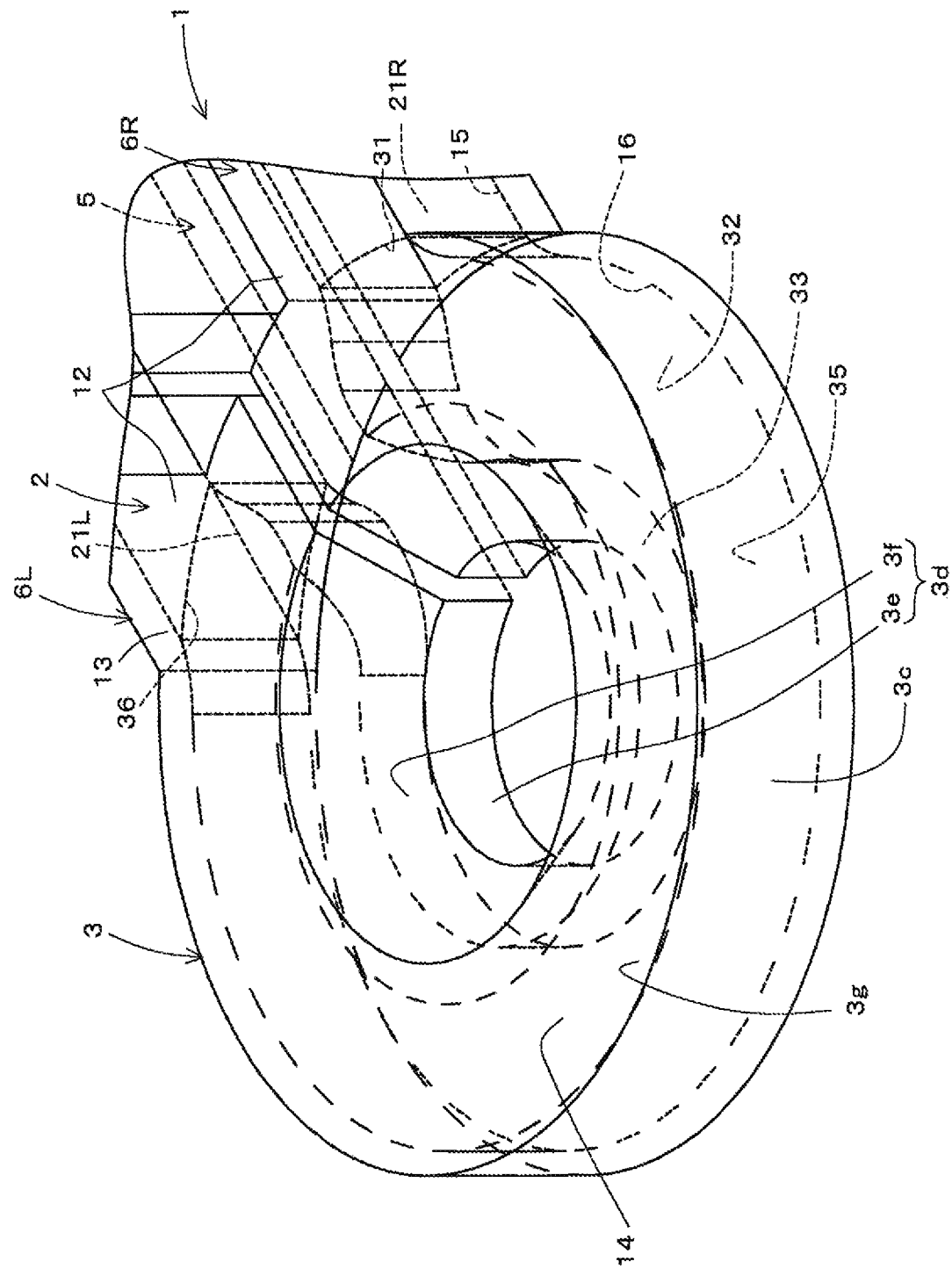
FIG. 6 is an enlarged perspective view of the periphery of the coil section of the induction heating coil.

FIG. 1 is a perspective view of an induction heating coil 1 according to a first embodiment of the present invention. FIG. 2 is a side view of the induction heating coil 1. FIG. 3 is a plan view of the induction heating coil 1. FIG. 4 is a cross-sectional view of the state in which the periphery of a coil section 3 of the induction heating coil 1 is viewed in a plan view. FIG. 5 is a cross-sectional view of the state in which the periphery of the coil section 3 is viewed in a side view. FIG. 6 is an enlarged perspective view of the periphery of the coil section 3 of the induction heating coil 1.

Note that in the following, "up and down", "front and rear", and "right and left" respectively refer to "up and down", "front and rear", and "right and left" when a viewer views the induction heating coil 1 in the state of facing the front surface of the induction heating coil 1.

Referring to FIGS. 1 to 3, the induction heating coil 1 is used for performing heat treatment, such as quenching treatment, on a treatment target 100 that is a metal rod such as a shaft. Examples of the treatment target 100 may include an intermediate shaft of a steering shaft of an automobile, and a gear wheel. The induction heating coil 1 induction-heats the treatment target 100 with power supplied from a commercial power source or the like, and thus subjects the treatment target 100 to heat treatment.

The current value of the power supplied to the induction heating coil 1 is extremely high, for example, a several thousand amperes. Therefore, if the induction heating coil 1 includes a portion in which electrical resistivity is discontinuous, fatigue failure is likely to occur due to the expansion and shrinkage caused by heat in that portion. Accordingly, the present embodiment employs the induction heating coil 1 in which such fatigue failure is not likely to occur.

The induction heating coil 1 is made from a material that is excellent in electrical conductivity and thermal conductivity. Examples of this material may include pure copper and oxygen-free copper. In the present embodiment, the induction heating coil 1 is produced by a metal additive fabrication method. In other words, the induction heating coil 1 does not have a configuration obtained by combining a plurality of metal members that are separately formed in advance into one piece using brazing or the like. The method for manufacturing the induction heating coil 1 will be described in detail later.

The induction heating coil 1 is formed in an elongated shape in the front-rear direction as a whole, and has a substantially L-shape when viewed in a side view and a substantially T-shape when viewed in a plan view. Furthermore, the induction heating coil 1 has a bilaterally symmetrical shape.

The induction heating coil 1 includes a power supply section 2, the coil section 3, an insulator 4, and a cooling water passage 5. In the present embodiment, the power supply section 2, the coil section 3, and the cooling water passage 5 are formed in one piece using a single member of unified structure.

The power supply section 2 is provided so as to supply power from a power source (not shown) to the coil section 3, and to circulate cooling water for cooling the coil section 3 to the coil section 3.

The power supply section 2 includes a first division 6R and a second division 6L.

The first division 6R and the second division 6L form a bilaterally symmetrical shape. Each of the divisions 6R and 6L includes a rear wall 7, a main body 8, and a rib 9.

The rear walls 7 are portions that are flat-plate shaped and directed in the front-rear direction. Each rear wall 7 is provided with a port 10. The port 10 is cylindrically shaped. One of the ports 10 is provided as a cooling water inlet, and the other one is provided as a cooling water outlet. The main body 8 extends frontward from the rear wall 7.

The main body 8 is a substantially L-shaped portion when viewed in a side view, and extends in the front-rear direction in an elongated manner. The main bodies 8 are arranged close to each other with the insulator 4 interposed therebetween. Each main body 8 includes a longitudinal wall portion 11 and a lower wall portion 12.

The longitudinal wall portion 11 is formed in a quadrangular prism. The longitudinal wall portion 11 is contiguous to the front surface of the corresponding rear wall 7, and is located on the lower end side of the corresponding rear wall 7. The lower wall portion 12 extends frontward from the corresponding longitudinal wall portion 11.

Each lower wall portion 12 is formed in the shape of a flat-plate, that is, a plate having an elongated rectangular shape extending in the front-rear direction. The thickness direction of the lower wall portion 12 is the up-down direction. The rib 9 extends upward from the corresponding lower wall portion 12.

The rib 9 is a plate-shaped portion that is formed so as to reinforce the main body 8, and is coupled to both the corresponding longitudinal wall portion 11 and lower wall portion 12. The thickness direction of the rib 9 is the right-left direction. The insulator 4 is interposed between the ribs 9.

The insulator 4 is provided as a portion that prevents the main bodies 8 from coming into direct contact with each other. The insulator 4 is a sheet-shaped portion arranged between the main bodies 8, and is fixed to the main bodies 8. An electrical current from one of the divisions 6R and 6L flows to the other one of the divisions 6R and 6L via the coil section 3.

The coil section 3 is provided as a section that induction-heats the treatment target 100 in the state of surrounding the treatment target 100. The coil section 3 has a substantially cylindrical shape, as a whole. The coil section 3 is contiguous to the front end sections of the lower wall portions 12 of the main bodies 8. The coil section 3 has a height that is smaller than the height (length in the up-down direction) of the power supply section 2, and is formed in a shape projecting frontward from the power supply section 2.

In the present embodiment, all the constituent components of the induction heating coil 1 excluding the insulator 4 are formed by the additive fabrication method. Accordingly, a connection section 13 at which the connecting the coil section 3 and the power supply section 2 are connected to each other has a shape in which the degree of concentration of heat stress is reduced. That is, in the present embodiment, the coil section 3, the power supply section 2, and the cooling water passage 5 of the induction heating coil 1 are formed using the metal additive fabrication method. "Metal additive fabrication method" refers to a method for sintering and producing a metal product in a desired shape by repeatedly performing an operation in which metal powder is laid in layers and an operation in which the metal powder in layers is selectively melted at positions, for example.

The coil section 3 is formed in the shape of an open circle that has ends, namely, one end 3a and the other end 3b. The one end 3a is contiguous to the front end of the lower wall portion 12 of the first division 6R. The other end 3b is contiguous to the front end of the lower wall portion 12 of the second division 6L.

An outer circumferential surface 3c of the coil section 3 is formed in the shape of an open cylinder having ends. An inner circumferential surface 3d of the coil section 3 includes a cylindrical surface 3e that is parallel to the outer circumferential surface 3c, and a tapered surface 3f that extends from the cylindrical surface 3e to an upper end surface 3g of the coil section 3. The cylindrical surface 3e is formed in the shape of an open cylinder having ends, and is arranged coaxially with the outer circumferential surface 3c. The lower end of the cylindrical surface 3e is contiguous to a lower end surface 3h of the coil section 3.

The tapered surface 3f is tapered in a cone such that its diameter increases toward the upper end surface 3g from the cylindrical surface 3e of the coil section 3. The upper end surface 3g and the lower end surface 3h of the coil section 3 are respectively formed on flat surfaces, and extend parallel to each other. Furthermore, the upper end surface 3g and the lower end surface 3h extend in the direction orthogonal to a central axis S1 of the coil section 3.

In the present embodiment, the upper end surface 3g of the coil section 3 and upper end surfaces 12a of the lower wall portions 12 are arranged on the same plane (coplanar). Furthermore, the lower end surface 3h of the coil section 3 and lower end surfaces 12b of the lower wall portions 12 are arranged on the same plane (coplanar). Furthermore, the front ends of the lower wall portions 12 are formed in an arc-shape, when viewed in a plan view, that is suited to the cylindrical shape of the outer circumferential surface 3c of the coil section 3.

Note that in the present embodiment, the connection section 13 at which the front ends of the lower wall portions 12 and the coil section 3 are connected to each other is formed not in a smoothly continuous curve, but in a discontinuous step-like shape. However, in the present embodiment, since the induction heating coil 1 is produced by the metal additive fabrication method, imbalance in heat strain due to heat stress when the temperature of the induction heating coil 1 is high is reduced. Accordingly, deterioration due to heat stress in strength of the connection section 13 at which the lower wall portions 12 of the divisions 6R and 6L and the coil section 3 are connected to each other is sufficiently suppressed.

The upper end surface 3g of the coil section 3 has a post-removal section 14. The post-removal section 14 is a section to which a support section 50 (that will be described later), which supports the coil section 3 as a predetermined portion while the induction heating coil 1 is formed by the metal additive fabrication method, had been connected. The post-removal section 14 is a remaining section after this support section 50 was removed. The post-removal section 14 is formed over the entire upper end surface 3g of the coil section 3, for example. The cooling water passage 5 is formed in the power supply section 2 and the coil section 3 that have the above-described configurations.

The cooling water passage 5 is an example of a "cooling medium passage" of the present invention. The cooling water passage 5 is provided as a section through which cooling water serving as a cooling medium for cooling the coil section 3 passes. In the present embodiment, the cooling water enters the induction heating coil 1 from the power supply section 2, passes through the coil section 3, then returns to the power supply section 2, and is discharged from the power supply section 2 to the outside of the induction heating coil 1. The cooling water passage 5 is arranged in the power supply section 2 and the coil section 3.

The cooling water passage 5 includes a power supply section side water passage 15 and a coil section side water passage 16.

The power supply section side water passage 15 is a water passage that is formed in the power supply section 2, and is configured to supply cooling water to the coil section side water passage 16 and to discharge the cooling water from the coil section side water passage 16. The power supply section side water passage 15 is an example of a "power supply section side water passage" of the present invention.

The power supply section side water passage 15 includes a first water passage 21R formed in the first division 6R and a second water passage 21L formed in the second division 6L.

The first water passage 21R is provided as a passage for supplying cooling water to the coil section side water passage 16. The first water passage 21R is open to the port 10 provided in the first division 6R, and is L-shaped in the rear wall 7 of the first division 6R when it is viewed in a front view. Ordinarily, in order to form, by machining, a section 21aR of the first water passage 21R that extends in the right-left direction in the rear wall 7 of the first division 6R, it is necessary to form a machining hole that is contiguous to that section 21aR and open to the right end surface of the rear wall 7. It is also necessary to provide a metal plug for filling this machining hole. However, in the present embodiment, since the induction heating coil 1 is produced by the additive fabrication method, such a metal plug is not necessary.

The first water passage 21R extends, in the first division 6R, from the rear wall 7 toward the corresponding longitudinal wall portion 11 of the main body 8, and further extends from the longitudinal wall portion 11 to the lower wall portion 12. The first water passage 21R extends, in the lower wall portion 12, straight in the front-rear direction. In the lower wall portion 12, the cross-sectional shape of the first water passage 21R that is orthogonal to the front-rear direction is rectangular (when viewed in a front view). At the front end of the lower wall portion 12, the front end portion of the first water passage 21R is rectangular when viewed in a front view, and is smoothly contiguous to the coil section side water passage 16. The first water passage 21R form a bilaterally symmetrically shape with the second water passage 21L.

The second water passage 21L is provided as a passage for discharging cooling water from the coil section side water passage 16. The second water passage 21L is open to the port 10 provided in the second division 6L, and is L-shaped in the rear wall 7 of the second division 6L when it is viewed in a front view. Ordinarily, in order to form, by machining, a section 21aL of the second water passage 21L that extends in the right-left direction in the rear wall 7 of the second division 6L, it is necessary to form a machining hole that is contiguous to that section 21aL and open to the left end surface of the rear wall 7. It is also necessary to provide a metal plug for filling this machining hole. However, in the present embodiment, since the induction heating coil 1 is produced by the additive fabrication method, such a metal plug is not necessary.

The second water passage 21L extends from the rear wall 7 of the second division 6L toward the corresponding longitudinal wall portion 11 of the main body 8L, and further extends from the longitudinal wall portion 11 to the lower wall portion 12. The second water passage 21L extends, in the lower wall portion 12, straight in the front-rear direction. In the lower wall portion 12, the cross-sectional shape of the second water passage 21L that is orthogonal to the front-rear direction is rectangular (when viewed in a front view). At the front end of the lower wall portion 12, the front end portion of the second water passage 21L is rectangular when viewed in a front view, and is smoothly contiguous to the coil section side water passage 16. The coil section side water passage 16 is connected to the first water passage 21R and the second water passage 21L that have the above-described configurations.

Referring to FIGS. 4 to 6, the coil section side water passage 16 is provided for cooling the coil section 3, particularly, the region of the inner circumferential surface 3d of the coil section 3 whose temperature is high. The coil section side water passage 16 is a water passage that is formed in the shape of an open circular ring having ends, as a whole, and is formed around the central axis S1 of the coil section 3. The coil section side water passage 16 is formed over a major portion of the coil section 3 in a circumferential direction C1 of the coil section 3.

The coil section side water passage 16 includes an inlet 31, an outer circumferential surface 32, an inner circumferential surface 33, an upper surface 34, a lower surface 35, an outlet 36, a first extended section 37, and a second extended section 38.

The inlet 31 is provided as a section that is smoothly connected to the front end portion of the first water passage 21R. The shape of the inlet 31 is the same as that of the front end portion of the first water passage 21R and, in the present embodiment, the inlet 31 is rectangular when viewed in a front view and extends in the circumferential direction C1. The portion between the inlet 31 and the front end portion of the first water passage 21R is not step-like, thus suppressing imbalance in strain due to heat stress in the connection section at which the inlet 31 and the first water passage 21R are connected to each other.

The outlet 36 is provided as a section that is smoothly connected to the front end portion of the second water passage 21L. The shape of the outlet 36 is the same as that of the front end portion of the second water passage 21L and, in the present embodiment, the outlet 36 is rectangular when viewed in a front view and extends in the circumferential direction C1. The portion between the outlet 36 and the front end portion of the second water passage 21L is not step-like, thus suppressing imbalance in strain due to heat stress in the connection section at which the outlet 36 and the second water passage 21L are connected to each other.

The outer circumferential surface 32, the inner circumferential surface 33, the upper surface 34, and the lower surface 35 extend between the inlet 31 and the outlet 36.

The outer circumferential surface 32 has an intermediate section 32c, which is the section excluding two ends 32a and 32b of the outer circumferential surface 32 in the circumferential direction C1 of the coil section 3. The intermediate section 32c is formed in the shape that corresponds to a part of the cylindrical surface, that is, in a substantially arc-shape when viewed in a plan view.

The one end section 32a of the outer circumferential surface 32 is a section connected to the inlet 31, and forms a curved surface that is smoothly curved toward the inlet 31. The center of curvature of the intermediate section 32c of the outer circumferential surface 32 is at the central axis S1 of the coil section 3, but the center of curvature A1 of the one end section 32a of the outer circumferential surface 32 is located outside of the induction heating coil 1 in the vicinity of the connection section 13 at which the power supply section 2 and the coil section 3 are connected to each other. Accordingly, by forming the outer circumferential surface 32 so that the center of curvature of the intermediate section 32c of the outer circumferential surface 32 differs from the center of curvature (direction in which the projection of the coil section 3 is directed when viewed in a plan view) of the one end section 32a, it is possible to form the region of the connection section at which the inlet 31 and the outer circumferential surface 32 are connected to each other in a smooth shape. Accordingly, in the region of the connection section at which the first water passage 21R and the coil section side water passage 16 are connected to each other, concentration of stress due to heat stress is suppressed. The other end section 32b of the outer circumferential surface 32 forms a bilaterally symmetrical shape with the one end section 32a of the outer circumferential surface 32.

The other end section 32b of the outer circumferential surface 32 is a section connected to the outlet 36, and forms a curved surface that is smoothly curved toward the outlet 36. The center of curvature A2 of the other end section 32b of the outer circumferential surface 32 is located outside of the induction heating coil 1 in the vicinity of the connection section 13 at which the power supply section 2 and the coil section 3 are connected to each other. Accordingly, by forming the outer circumferential surface 32 so that the center of curvature of the intermediate section 32c of the outer circumferential surface 32 differs from the center of curvature (direction in which the projection of the coil section 3 is directed when viewed in a plan view) of the other end section 32b, it is possible to form the region of the connection section for connecting the outlet 36 and the outer circumferential surface 32 in a smooth shape. Accordingly, in the region of the connection section at which the second water passage 21L and the coil section side water passage 16 are connected to each other, concentration of stress due to heat stress is suppressed. The inner circumferential surface 33 is arranged so as to be surrounded by the outer circumferential surface 32.

The inner circumferential surface 33 extends from the inlet 31 toward the central axis S1 of the coil section 3, further extends in the circumferential direction C1, and then extends toward the outlet 36. The inner circumferential surface 33 includes one end section 33a, the other end section 33b, and an intermediate section 33c.

The one end section 33a of the inner circumferential surface 33 is provided as a section that extends from the inlet 31 toward the inner circumferential surface 3d of the coil section 3. When viewed in a plan view, the one end section 33a of the inner circumferential surface 33 has a shape extending away from the one end section 32a of the outer circumferential surface 32 with increasing distance from the inlet 31, and is curved so as to form a projection toward the one end 3a of the coil section 3. The one end section 33a of the inner circumferential surface 33 is formed as a surface that is entirely smoothly continuous, and is connected smoothly to the intermediate section 33c of the inner circumferential surface 33. When viewed in a plan view, a boundary portion 33d between the one end section 33a and the intermediate section 33c of the inner circumferential surface 33 is located near a virtual line L1 that connects the central axis S1 of the coil section 3 and the one end section 32a of the outer circumferential surface 32. This boundary portion 33d is located at a position at which it overlaps a tapered surface 3f of the inner circumferential surface 3d of the coil section 3, when viewed in a plan view. The other end section 33b of the inner circumferential surface 33 is arranged so as to form a bilaterally symmetrical shape with the one end section 33a of the inner circumferential surface 33.

The other end section 33b of the inner circumferential surface 33 is provided as a section that extends from the outlet 36 toward the inner circumferential surface 3d of the coil section 3. When viewed in a plan view, the other end section 33b of the inner circumferential surface 33 has the shape extending away from the other end section 32b of the outer circumferential surface 32 with increasing distance from the outlet 36, and is curved so as to form a projection toward the other end 3b of the coil section 3. The other end section 33b of the inner circumferential surface 33 is formed as a surface that is entirely smoothly continuous, and is connected smoothly to the intermediate section 33c of the inner circumferential surface 33. When viewed in a plan view, a boundary portion 33e between the other end section 33b and the intermediate section 33c of the inner circumferential surface 33 is located near a virtual line L2 that connects the central axis S1 of the coil section 3 and the other end section 32b of the outer circumferential surface 32. This boundary portion 33e is arranged at a position at which it overlaps the tapered surface 3f of the inner circumferential surface 3d of the coil section 3, when viewed in a plan view.

The intermediate section 33c of the inner circumferential surface 33 is formed coaxially with the intermediate section 32c of the outer circumferential surface 32, and is arc-shaped when viewed in a plan view. The lower ends of the inner circumferential surface 33 and the outer circumferential surface 32 are connected to each other by the lower surface 35. The lower surface 35 of the coil section side water passage 16 extends parallel to the lower end surface 3h of the coil section 3. Furthermore, the upper end of the inner circumferential surface 33 and the upper end of the outer circumferential surface 32 are connected to each other by the upper surface 34.

The upper surface 34 of the coil section side water passage 16 is formed coaxially with the lower surface 35, and is formed in the shape of an open circular ring having ends, when viewed in a plan view. This upper surface 34 has a flat surface 34a and an inclined surface 34b.

The flat surface 34a extends parallel to the upper end surface 3g of the coil section 3. This flat surface 34a is contiguous to the entire area of the upper end of the outer circumferential surface 32, and contiguous to the two ends 33a and 33b of the inner circumferential surface 33. The inclined surface 34b of the coil section side water passage 16 is inclined and extends from the inner circumference of the flat surface 34a of the coil section side water passage 16 to the inner circumferential surface 33. The inner circumferential surface 33 is tapered extending downward in an inclined manner from the flat surface 34a to the inner circumferential surface 33. One end of this inclined surface 34b in the circumferential direction C1 is contiguous to the one end section 33a of the inner circumferential surface 33. The other end of this inclined surface 34b in the circumferential direction C1 is contiguous to the other end section 33b of the inner circumferential surface 33.

According to the above-described configuration, the first extended section 37 is formed in the vicinity of the inlet 31 of the coil section side water passage 16, and the second extended section 38 is formed in the vicinity of the outlet 36 of the coil section side water passage 16.

The area of a cross section that is orthogonal to a traveling direction F1 of cooling water is larger in the first extended section 37 than at the inlet 31. Downstream of the lower first extended section 37 in the traveling direction F1, the cross-sectional area of the coil section side water passage 16 in the intermediate section 32c of the outer circumferential surface 32 is smaller than that in the first extended section 37. That is, the coil section side water passage 16 has a complicated shape such that the area of its cross-section orthogonal to the traveling direction F1 locally increases in the periphery of the inlet 31 and then decreases.

Similarly, the cross-sectional area of the coil section side water passage 16 that is orthogonal to the traveling direction F1 of cooling water is smaller in the intermediate section 32c of the outer circumferential surface 32 than in the second extended section 38. Also, the cross-sectional area of the cross-section orthogonal to the traveling direction F1 is larger in the second extended section 38 than in the outlet 36. That is, the coil section side water passage 16 has a complicated shape such that the area of the cross-section orthogonal to the traveling direction F1 increases as the coil section side water passage 16 extends from the intermediate section 32c of the outer circumferential surface 32 to the second extended section 38, and then decreases at the outlet 36.

With the foregoing configuration, the connection section 13 at which the power supply section side water passage 15 and the coil section side water passage 16 are connected to each other has a cross-sectional area that changes continuously in the traveling direction F1 of the cooling water. This is the overall configuration of the induction heating coil 1. Hereinafter, a system for manufacturing the induction heating coil 1 and a method for manufacturing the induction heating coil 1 will be described.

Induction Heating Coil Manufacturing System

Figure 7:
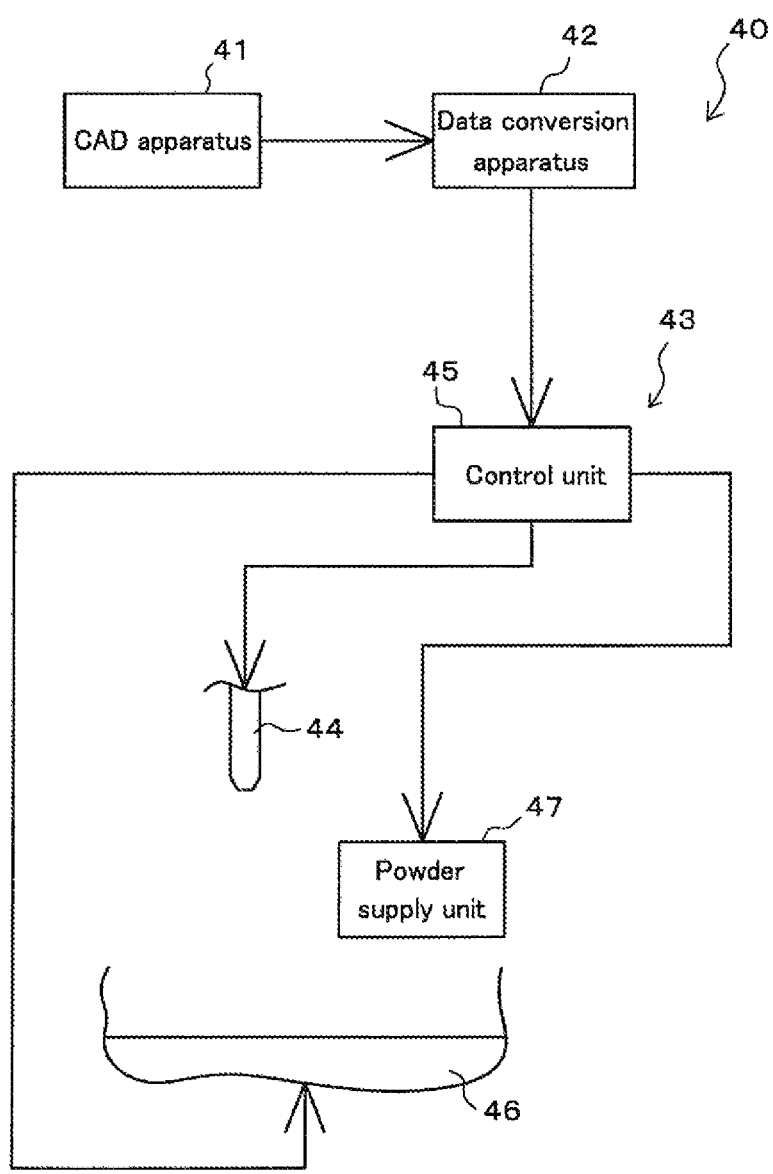
FIG. 7 is a diagram schematically showing a manufacturing system for manufacturing the induction heating coil.

FIG. 7 is a diagram schematically showing a manufacturing system 40 for manufacturing the induction heating coil 1. As shown in FIG. 7, the manufacturing system 40 includes a computer aided design (CAD) apparatus 41, a data conversion apparatus 42, and a manufacturing apparatus 43.

The CAD apparatus 41 is a 3D-CAD apparatus capable of displaying images three-dimensionally on a screen, for example. In the present embodiment, the CAD apparatus 41 includes a computer, and software that is installed in the computer. A designer of the induction heating coil 1 operates the CAD apparatus 41 to generate CAD data (image data) for use in producing the induction heating coil 1. The CAD data generated by the CAD apparatus 41 is output to the data conversion apparatus 42.

The data conversion apparatus 42 is provided as an apparatus for converting the CAD data into data for use in operating the manufacturing apparatus 43. In the present embodiment, the data conversion apparatus 42 includes a computer, and software that is installed in the computer.

The data conversion apparatus 42 divides, for example, the three-dimensional image of the induction heating coil 1 that is specified by the CAD data into a plurality of layer images (two-dimensional images) by slicing the three-dimensional image at a predetermined interval in the up-down direction of the coil section 3, and stores data on the plurality of layer images. The predetermined interval corresponds to the thickness of one of metal powder layers laminated in the manufacturing apparatus 43, and is about several tens of μm, for example. The data on the plurality of layer images is supplied to the manufacturing apparatus 43.

The manufacturing apparatus 43 is an apparatus for melting and sintering metal powder. In the present embodiment, the manufacturing apparatus 43 manufactures the induction heating coil 1 by, for example, a selective laser melting method. In the present embodiment, the manufacturing apparatus 43 includes a laser light source 44, a control unit 45, a movable table 46, and a powder supply unit 47.

The laser light source 44 is provided for supplying heat energy to the metal powder. Note that a laser beam from the laser light source 44 may be emitted to a desired position in the metal powder by the laser light source 44 itself being displaced using a driving unit (not shown), or may be emitted to the desired position using a galvanometer mirror in the state in which the laser light source 44 is fixed. The laser light source 44 is controlled by the control unit 45.

The control unit 45 includes a CPU, a RAM, a ROM, and the like, and data is supplied to the control unit 45 by the data conversion apparatus 42. The control unit 45 controls the laser light source 44, the movable table 46, and the powder supply unit 47. More specifically, the control unit 45 determines a laser beam emission amount that is to be emitted to a predetermined position in the metal powder based on the image data supplied from the data conversion apparatus 42, and emits the determined laser beam emission amount to the predetermined position in the metal powder. Note that the laser beam emission amount may also be set by the data conversion apparatus 42.

The metal powder to be irradiated with the laser beam is placed on the movable table 46. The movable table 46 is provided for holding the metal powder. The movable table 46 has, for example, a substantially horizontal upper surface on which the metal powder is placed. Furthermore, the movable table 46 has a driving mechanism (not shown), and is displaceable in the up-down direction. Metal powder is supplied to the movable table 46 from the powder supply unit 47.

The powder supply unit 47 includes an accommodation unit for accommodating metal powder, and a supply unit for supplying metal powder to the movable table 46. The powder supply unit 47 forms a metal powder layer having a thickness that corresponds to the above-described predetermined interval (several tens of μm in the present embodiment) on the movable table 46.

Induction Heating Coil Manufacturing Process

Figure 8:
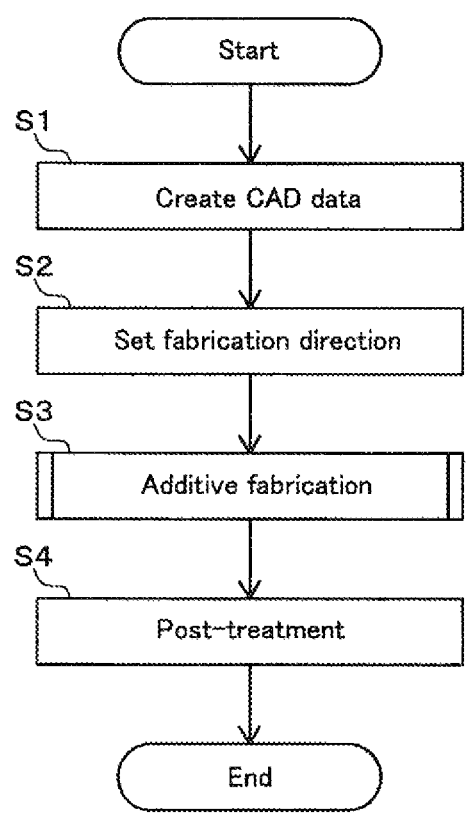
FIG. 8 is a flowchart illustrating an example of an induction heating coil manufacturing process.

Hereinafter, the process for manufacturing the induction heating coil 1 will be described with reference to FIG. 8 and the like. FIG. 8 is a flowchart illustrating an example of a process for manufacturing the induction heating coil 1. Note that in the following, when description is given using the flowchart, the drawings other than the flowchart are referenced when appropriate.

Referring to FIG. 8, when the induction heating coil 1 is to be manufactured, a designer first generates CAD data on the induction heating coil 1 using the CAD apparatus 41 (step S1).

Then, the designer sets a laminating direction in which metal powder is laminated at the time of additive fabrication of the induction heating coil 1 in the manufacturing apparatus 43 (step S2). In the present embodiment, the laminating direction is set so that the induction heating coil 1 is completed in a downward orientation, for example. Then, the manufacturing apparatus 43 manufactures the induction heating coil 1 based on the CAD data by the metal additive fabrication method (step S3). This step S3 is an example of the "additive fabrication process" according to the present invention. The induction heating coil 1 is thus completed. Then, the support section 50 that is formed on the induction heating coil 1 is removed in a post-treatment process (step S4).

Figure 9:
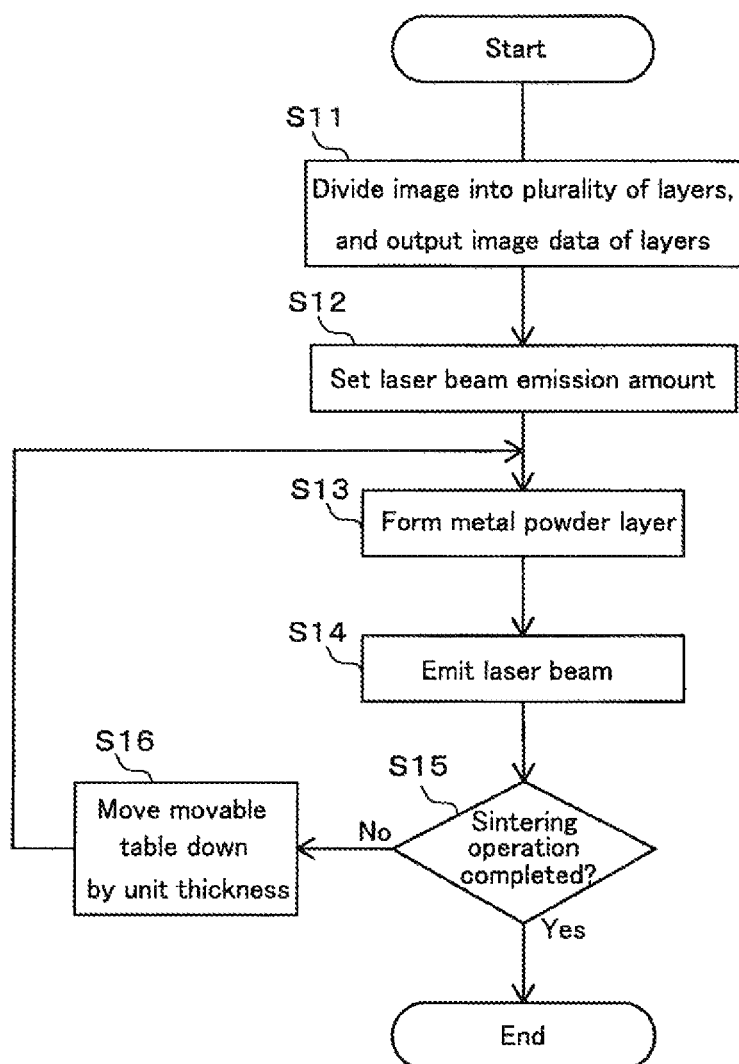
FIG. 9 is a flowchart illustrating an example of an additive fabrication process.

Hereinafter, the additive fabrication process (step S3) using the manufacturing apparatus 43 will be described more specifically. FIG. 9 is a flowchart illustrating an example of the additive fabrication process. Referring to FIG. 9, in the additive fabrication process, the data conversion apparatus 42 first divides a three-dimensional image of the induction heating coil 1 that is specified by the CAD data generated by the CAD apparatus 41 into a plurality of layers each having a predetermined thickness. Then, the data conversion apparatus 42 outputs image data on the layers to the control unit 45 of the manufacturing apparatus 43 (step S11). The control unit 45 reads the image data on the layers, and sets a laser beam emission amount for each pixel (corresponding to each position on the movable table 46) of the layer (step S12).

Figure 10A:
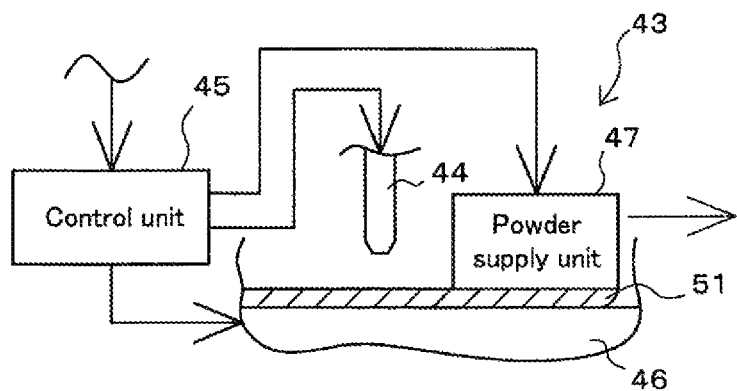
FIG. 10A is a schematic side view of main constituent components illustrating the additive fabrication process, a part of the main constituent components being shown in a cross-sectional view.
Figure 10B:
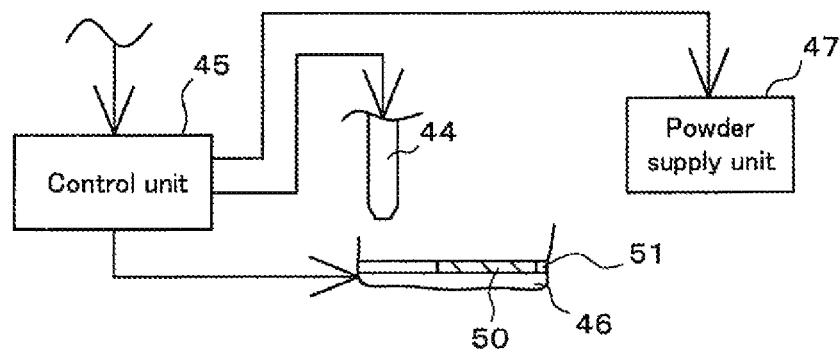
FIG. 10B is a schematic side view of main constituent components illustrating the additive fabrication process, a part of the main constituent components being shown in a cross-sectional view.

Then, the control unit 45 drives the powder supply unit 47. Accordingly, as shown in FIG. 10A the powder supply unit 47 forms a metal powder layer 51 having the above-described thickness on the upper surface of the movable table 46 (step S13). That is, metal powder has been prepared. Then, the control unit 45 drives the laser light source 44. Accordingly, the laser light source 44 emits the laser beam emission amount that was set by the control unit 45 to a predetermined position in the metal powder layer 51 (step S14). Accordingly, as shown in FIG. 10B, a part of the metal powder layer 51 is melted and thereby sintered.

Then, the control unit 45 determines whether or not the sintering operation has been completed with respect to all the layers (step S15). If it is determined that the sintering operation has not been completed (No, in step S15), the control unit 45 drives the movable table 46, and displaces the movable table 46 downward by an amount that is the same as the thickness of the metal powder layer 51 (step S16).

The control unit 45 again drives the powder supply unit 47. Accordingly, the powder supply unit 47 forms a metal powder layer again (step S13). Then, the control unit 45 drives the laser light source 44. Accordingly, the laser light source 44 emits the laser beam emission amount that was set by the control unit 45 to a predetermined position in the metal powder layer (step S14). Accordingly, a part of the metal powder layer is melted and thereby sintered. By changing the amounts of metal powder to be melted according to the positions in this way, the constituent components of the induction heating coil 1 excluding the insulator 4 is formed with a predetermined density.

Figure 10C:
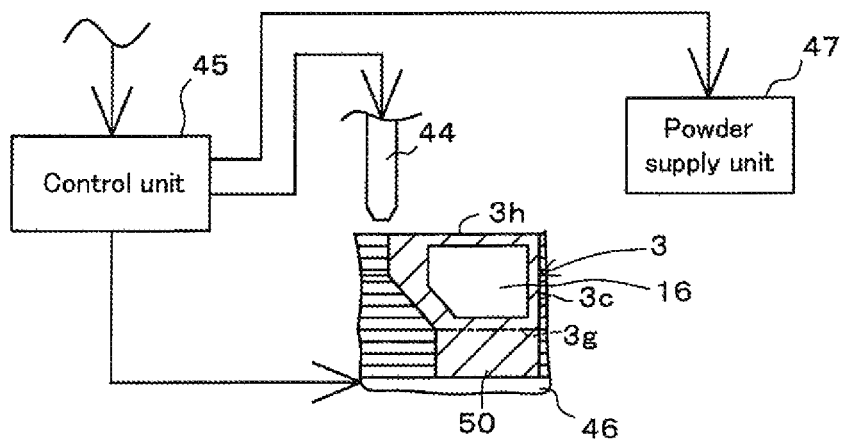
FIG. 10C is a schematic side view of main constituent components illustrating the additive fabrication process, a part of the main constituent components being shown in a cross-sectional view.

In the manufacturing apparatus 43, steps S13 to S16 are repeated until the sintering operation is completed with respect to all the layers. Accordingly, as shown FIG. 10C, metal powder layers n, n+1, n+2, . . . (n is a positive integer) are laminated and the induction heating coil 1 is formed. In this laminating process, not only the induction heating coil 1 but also the support section 50 is formed.

The support section 50 is provided for suppressing positional aberration of the coil section 3 serving as a projection that projects from the power supply section 2, such as sinking of the coil section into the metal powder layer 51 due to its own weight, during fabrication in the laminating process. In the present embodiment, the induction heating coil 1 is formed by the manufacturing apparatus 43 in the state of being upside down. Therefore, the coil section 3 is fabricated in the state of being supported from below by the support section 50.

If the control unit 45 determines that the sintering operation has been performed with respect to all the layers (Yes, in step S15), the sintering processing ends. Referring to FIG. 8, the post-treatment (step S4) after the fabrication process includes processing in which an operator moves the induction heating coil 1 formed on the movable table 46 away from the movable table 46, and removes unnecessary metal powder attached to the induction heating coil 1 from the induction heating coil 1. Furthermore, in this processing, the support section 50 is removed from the induction heating coil 1 using a cutter (not shown) or the like. Step S4 is an example of "removing process" of the present invention. Furthermore, in the post-treatment process (step S4), the insulator 4 is attached to the power supply section 2. The induction heating coil 1 is thus completed.

As described above, according to the present embodiment, the cooling water passage 5 in the coil section 3 and the power supply section 2 is formed using the metal additive fabrication method. In the metal additive fabrication method, it is possible to form any three-dimensional shape by repeatedly performing an operation in which the metal powder layer 51 is selectively heated and melted, and then this melted metal is allowed to harden. Therefore, even when the cooling water passage 5 formed in the coil section 3 and the power supply section 2 has a complicated shape, it is possible to form the power supply section 2 and the coil section 3 as a single member of unified structure. Accordingly, no brazed section needs to be provided on the coil section 3 itself, and no brazed section needs to be provided between the power supply section 2 and the coil section 3 in order to connect the power supply section 2 and the coil section 3. This eliminates the need for a brazing operation that requires proficiency. Furthermore, the metal additive fabrication method enables mass-production of uniformly-shaped induction heating coils 1 with high mechanical accuracy. It is thus possible to mass-produce induction heating coils 1 with uniform dimensions.

Furthermore, since the formation of the coil section 3 itself does not need brazing, and also the coil section 3 and the power supply section 2 do not need to be brazed, heat strain that is caused by a brazing operation does not occur in the coil section 3 itself and does not occur between the power supply section 2 and the heating coil section 3. Therefore, no special jig for lowering such heat strain is needed, making it possible to manufacture the induction heating coil 1 more easily.

Furthermore, since an operation for setting the above-described jig for brazing is not needed, it is possible to raise the efficiency of producing the induction heating coil 1. Moreover, when the metal additive fabrication method is used, the flexibility in setting the shape is high. This can achieve a high flexibility in setting the shape of the induction heating coil 1 for achieving the heat treatment most appropriate for a treatment target 100 subjected to the treatment. Furthermore, since a brazed section, in which electrical resistance is discontinuous, is not needed, it is possible to reduce imbalance in heat stress in the coil section 3 and the connection section 13 at which the power supply section 2 and the coil section 3 are connected to each other. Accordingly, the lifetime of the induction heating coil 1 can further be extended.

Therefore, according to the present embodiment, it is possible to manufacture the induction heating coil 1 so as to have a longer lifetime. It is furthermore possible to manufacture the induction heating coil 1 more easily and with higher accuracy, and to further improve the efficiency of producing the induction heating coil 1.

Furthermore, according to the present embodiment, the volume of the support section 50 that is removed by machining in the post-treatment process that is performed after the additive fabrication process is small, making it possible to improve the material yield of the induction heating coil 1. As a result, a reduction in material cost makes it possible to suppress the manufacturing cost of the induction heating coil 1. Furthermore, by changing the densities at the portions that are to be melted in the additive fabrication process, it is possible to realize the light-weight heating coil section 3. This leads to a further reduction in the material of the coil section 3, and thus it is possible to further reduce the material cost for the induction heating coil 1. Furthermore, the lifetime of the induction heating coil 1 can further be extended by a reduction in stress that acts on the connection section 13 at which the coil section 3 and the power supply section 2 that supports the coil section 3 are connected to each other. The additive fabrication method further enables the shape of the coil section that is finished by hand working of a skilled operator to easily be reproduced (reverse engineered).

Furthermore, according to the present embodiment, when the induction heating coil 1 is formed by the metal additive fabrication method, the support section 50 that supports the coil section 3 of the induction heating coil 1 is formed. Also, the induction heating coil 1 includes the post-removal section 14 that remains after the support section 50 was removed. According to this configuration, the support section 50 can be used for preventing the coil section 3, serving as a projection projecting from the power supply section 2, from causing positional aberration such as sinking of the coil section 3 into the metal powder layer 51 due to its own weight, during fabrication by the metal additive fabrication method. Accordingly, it is possible to improve the dimensional accuracy of the induction heating coil 1.

Particularly, in the present embodiment, the coil section 3 has a height that is smaller than the height of the power supply section 2, and is formed in a shape projecting from the power supply section 2. The support section 50 supports the coil section 3 while the induction heating coil 1 is formed by the metal additive fabrication method. According to this configuration, it is possible to form the induction heating coil 1 having the thin coil section 3 with higher accuracy.

Furthermore, according to the present embodiment, the cross-sectional area of the connection section 13 at which the power supply section side water passage 15 and the coil section side water passage 16 are connected to each other continuously changes in the traveling direction F1 of cooling water. The shape of the connection section 13 at which the power supply section 2 and the coil section 3 are connected to each other changes largely, and heat stress is likely to increase locally in the connection section 13. In the periphery of this connection section 13, the shape of the cooling water passage 5 changes continuously. Accordingly, it is possible to suppress imbalance in heat stress in the connection section 13. It is thus possible to further extend the lifetime of the induction heating coil 1.

Furthermore, according to the present embodiment, the coil section 3, the power supply section 2, and the cooling water passage 5 are formed in one piece using a single member of unified structure. According to this configuration, no brazed section needs to be provided either on the coil section 3 itself or between the power supply section 2 and the coil section 3. Accordingly, heat strain that is caused by a brazing operation does not occur between the power supply section 2 and the heating coil section 3. Therefore, no special jig for lowering such heat strain is needed, making it possible to manufacture the induction heating coil 1 more easily. Furthermore, since an operation for setting the above-described jig for brazing is not needed, it is possible to raise the efficiency of producing the induction heating coil 1. Furthermore, since a brazed section, in which electrical resistance is discontinuous, is not needed, it is possible to reduce imbalance in heat stress in the coil section 3 and the connection section 13 at which the power supply section 2 and the coil section 3 are connected to each other. Accordingly, the lifetime of the induction heating coils 1 can further be extended.

Furthermore, according to the present embodiment, no brazed section is provided in the heating coil section 3 and the power supply section 2. Accordingly, no brazed section is provided in the connection section 13 either. Therefore, heat strain that is caused by a brazing operation does not occur in the heating coil section 3 and the power supply section 2. Furthermore, since a brazed section, in which electrical resistance is discontinuous, is not needed, it is possible to reduce imbalance in heat stress in the heating coil section 3 and the power supply section 2. Accordingly, the lifetime of the induction heating coils 1 can further be extended. Moreover, the heating coil section 3 and the power supply section 2 are formed in one piece of unified structure from the same electrically-conductive metal material. Therefore, as compared with a conventional coil section and a power supply section that are combined and formed by brazing to combine a plurality of pieces which are made from different kind of metal materials respectively, variation in electrical resistivity per unit volume in the entire region of the heating coil section 3 and the power supply section 2 is small. Furthermore, variation in electrical resistivity ($\Omega \cdot m$) per unit volume (1 $mm^3$) in the entire region of the heating coil section 3 and power supply section 2 is at least 10% or less, particularly, in the present embodiment, 5% or less, and at least ½ of the variation in electrical resistivity of a coil section that is formed using silver solder. Accordingly, there is not likely to be a difference in the variation in expansion and shrinkage amount of the heating coil section 3 and power supply section 2 when the heating coil section 3 and power supply section 2 expand and shrink due to heat. Accordingly, it is possible to lessen fatigue failure in the heating coil section 3 and the power supply section 2, and the extension of the lifetimes of the heating coil section 3 and the power supply section 2 can further extend the lifetime of the induction heating coil 1.

Hereinafter, qualitative comparison between the induction heating coil 1 and a conventional induction heating coil 1'

(not shown) will be performed. Note that values and comparison written in this description is based on the theoretical estimation. The induction heating coil 1' has a configuration in which the power supply section and the coil section are formed separately and then are connected to each other by brazing, and has substantially the same shape as that of the induction heating coil 1. In this embodiment, metal material with electrical conductivity that constitutes the induction heating coil 1 is pure copper or oxygen-free copper.

With regard to the induction heating coil 1, an electrical resistivity about the constituent components of the induction heating coil 1 excluding the insulator 4 can be set a value near an electrical resistivity of pure copper or oxygen-free copper (about $1.7 \times 10^{-8}$ Ω·m). On the other hand, a brazed section of the induction heating coil 1' has a portion made of pure copper or oxygen-free copper, insulator, and brazed section, and the electrical resistivity of the brazed section is about $9.1 \times 10^{-8}$ Ω·m. Accordingly, the electrical resistivity of the brazed section is larger than the electrical resistivity of the portion made of pure copper or oxygen-free copper, in the induction heating coil 1', difference of electrical resistivity between the conductive portion except for brazed portion and the brazed portion is large.

Figure 11A:
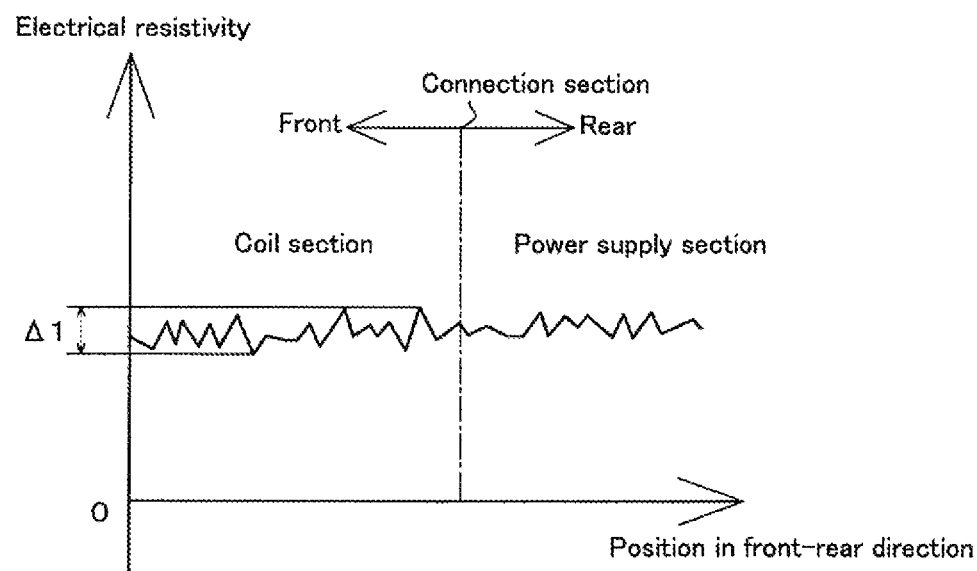
FIG. 11A is a graph schematically showing the electrical resistivity of the constituent components of the induction heating coil according to the first embodiment.

As shown in FIG. 11A a variation amount Δ1 in electrical resistivity in the vicinity of the connection section 13 at which the power supply section 2 and the coil section 3 are connected to each other in the front-rear direction of the induction heating coil 1 is small at about 1%. The variation in electrical resistivity in the induction heating coil 1 can be at least ½ or less, ⅓ or less, ¼ or less, or ⅕ or less of the variation in electrical resistivity of the induction heating coil 1' having the brazed configuration. Note that one of the reasons why the variation amount Δ1 is not zero lies in variation in the void ratio of the material of the power supply section 2 and the coil section 3 when they are formed by the metal additive fabrication method.

Meanwhile, among types of JIS silver solder defined by the Japanese Industrial Standards (JIS), BAG-1A has a component combination of Ag: 50%, Cu: 15.5%, Zn: 16.5%, and Cd: 18%. Also, the conductivity of this BAG-1A (IACS) is 25%. Furthermore, the JIS silver solder BAG-1 has a component combination of Ag: 45%, Cu: 15%, Zn: 16%, and Cd: 24%. Also, the conductivity of this BAG-1 (IACS) is 19%.

Note that the above-described conductivity is a conductivity ratio assuming that the conductivity of a standard annealed copper wire that is defined by the IACS (International Annealed Copper Standard, International Annealed Copper Wire Standard) is 100%. That is, the above-described BAG-1A and BAG-1 have conductivities that are about ¼ to ⅕ of copper, and have a large electrical resistivity. In other words, variation in electrical resistivity of the induction heating coil 1 can also be reduced significantly as compared with that of the induction heating coil 1' in which a brazing material is used.

Figure 11B:
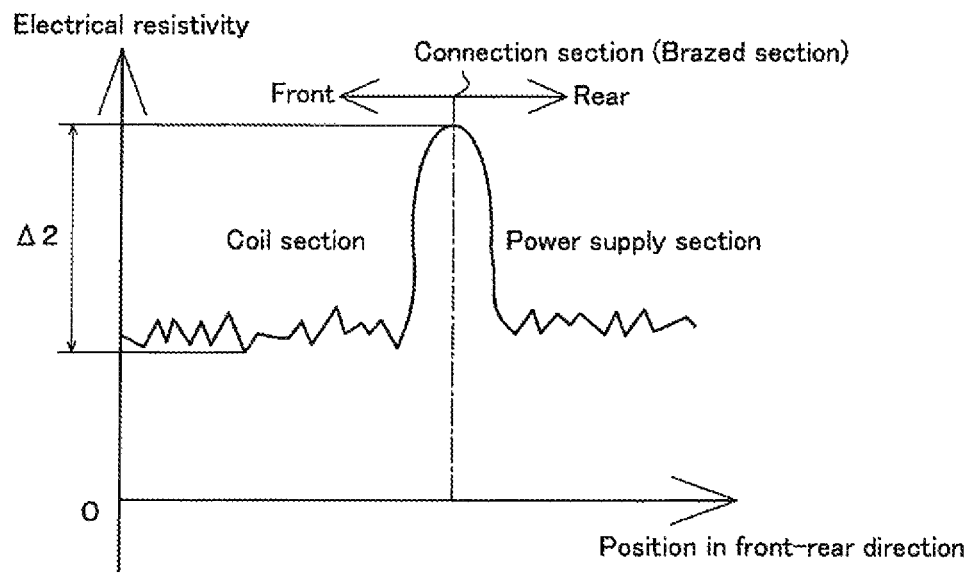
FIG. 11B is a graph schematically showing the electrical resistivity of constituent components of an induction heating coil according to a comparative example.

Note that FIG. 11A is a graph schematically showing the electrical resistivity of the constituent components of the induction heating coil 1 according to the first embodiment, and FIG. 11B is a graph schematically showing the electrical resistivity of the constituent components of the induction heating coil 1' according to the comparative example. In FIGS. 11A and 11B, the horizontal axis shows positions of the corresponding constituent components in the front-rear direction, and the vertical axis shows values of the electrical resistivity.

In contrast, as shown in FIG. 11B, a variation amount Δ2 in electrical resistivity in the vicinity of the connection section at which the power supply section and the coil section are connected to each other in the front-rear direction of the induction heating coil 1' is several tens of %. Accordingly, in the induction heating coil 1', the brazed section largely expands and shrinks repeatedly each time the induction heating coil 1' is heated and cooled, and fatigue failure is likely to occur. In contrast, the induction heating coil 1 of the present embodiment does not include a brazed section. Accordingly, in the induction heating coil 1, the connection section 13 does not largely expand and shrink even when the induction heating coil 1 is heated and cooled repeatedly, and fatigue failure is not likely to occur. It is thus clear that the induction heating coil 1 has excellent durability.

Furthermore, the process for manufacturing the induction heating coil 1' is complicated as compared with the process for manufacturing the induction heating coil 1, and the manufacture of the induction heating coil 1 is significantly easier. More specifically, the process for manufacturing the conventional induction heating coil 1' needs eight steps of (1) designing the coil section; (2) designing the brazed section; (3) designing a jig for lowering strain at the time of brazing; (4) manufacturing this jig; (5) manufacturing the power supply section and the coil section; (6) brazing the power supply section and the coil section; (7) performing finish processing in order to ensure the dimensional accuracy; and (8) performing pickling after the brazing step (oxidized film removal).

Note that in the above-described step of (2) designing the brazed section, proficiency is required for design for avoiding stress concentration as much as possible. Furthermore, in the above-described step of (5) manufacturing the power supply section and the coil section, machining is needed to be performed for each section, resulting in a yield reduction (material loss due to shaving). Furthermore, in the above-described step of (6) brazing, proficiency of an operator is required since brazing operation cannot be undone in the case of a brazing failure. Furthermore, in the above-described step of (7) performing finish processing, removing heat strain occurring in the brazing step, for example, is troublesome.

In contrast, as described above, the process for manufacturing the induction heating coil 1 needs only four steps of (1) designing (step S1); (2) setting a fabrication direction (step S2); (3) performing an additive fabrication process (step S3); and (4) performing a post-treatment process such as removing the support section 50 (step S4).

Furthermore, all of the steps S1 to S3 are performed using a computer, and thus the influence of the degree of proficiency of an operator is significantly reduced, making it possible to mass-produce highly accurate induction heating coils 1 with high yield. Note that in the above-described step of (4) performing a post-treatment process, the support section 50 is removed as an unnecessary member, but this support section 50 has a low volume, and thus the material yield of the induction heating coil 1 is hardly influenced.

Figure 12:
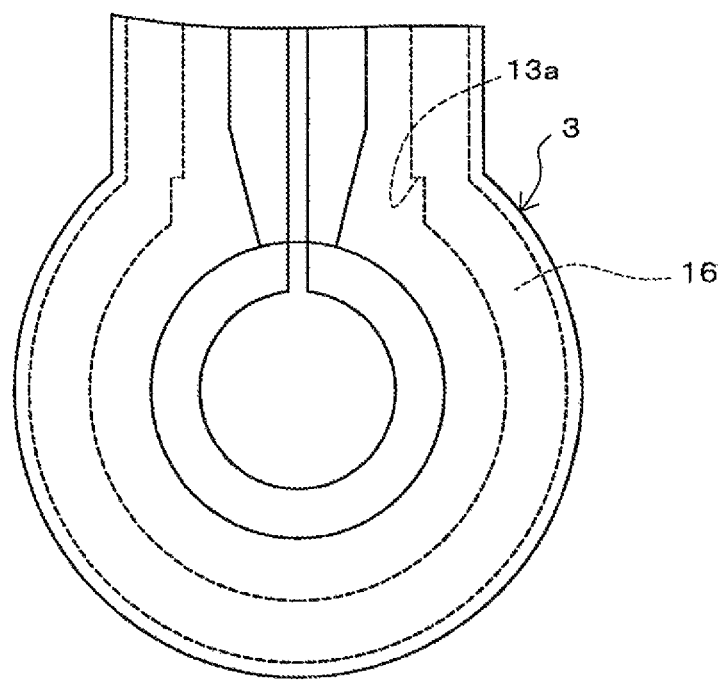
FIG. 12 is a plan view of main constituent components according to a modification of the first embodiment.

Note that in the foregoing embodiment, the cooling water passage 5 has a smooth shape in the region of the connection section 13 at which the power supply section side water passage 15 and the coil section side water passage 16 are connected to each other. However, the present invention is not limited to this. For example, as shown in FIG. 12, the cooling water passage 5 may have a step-like portion 13a in the region of the connection section 13 at which the power supply section side water passage 15 and the coil section side water passage 16 are connected to each other.

Second Embodiment

Figure 13:
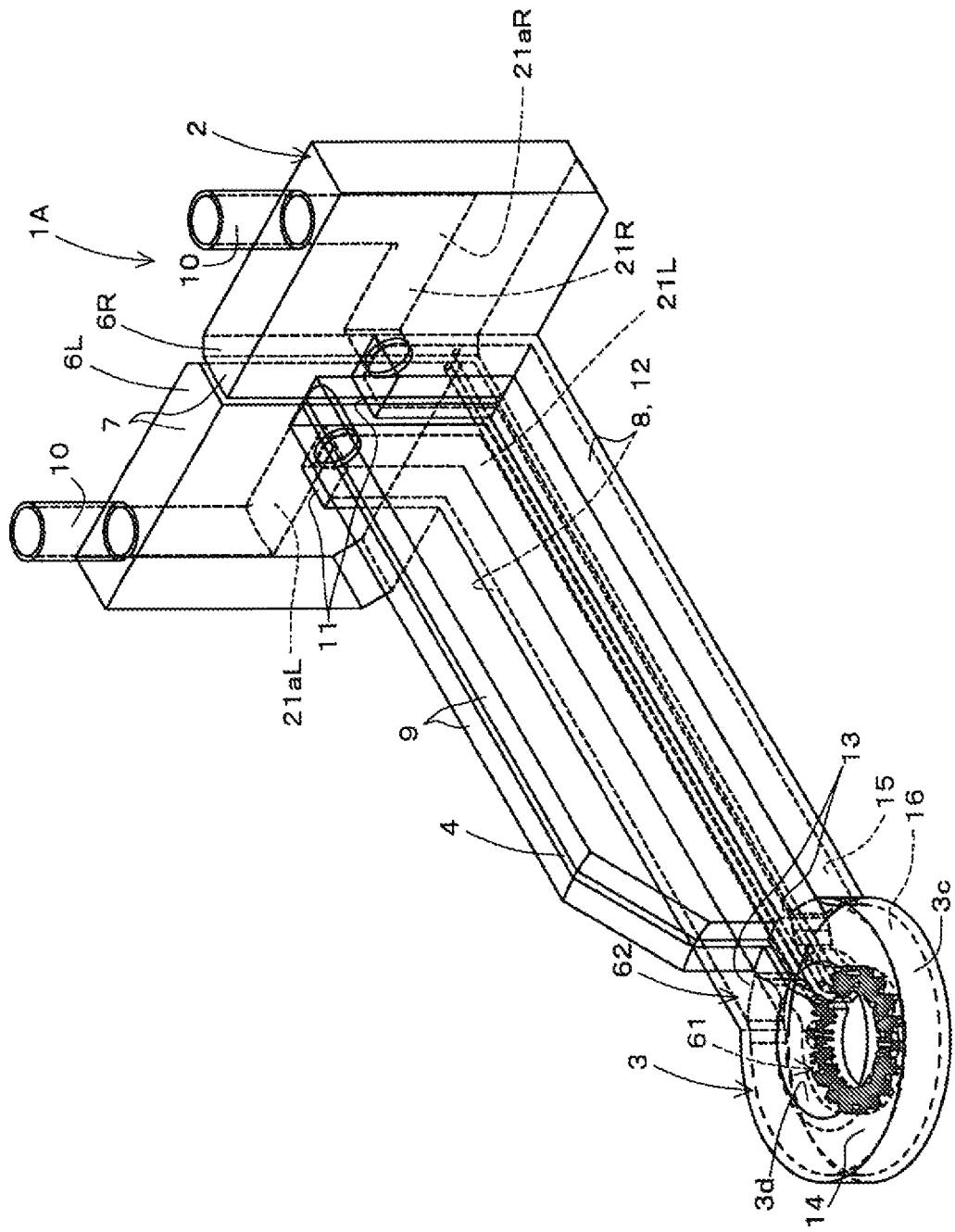
FIG. 13 is a perspective view of an induction heating coil according to a second embodiment of the present invention.
Figure 14:
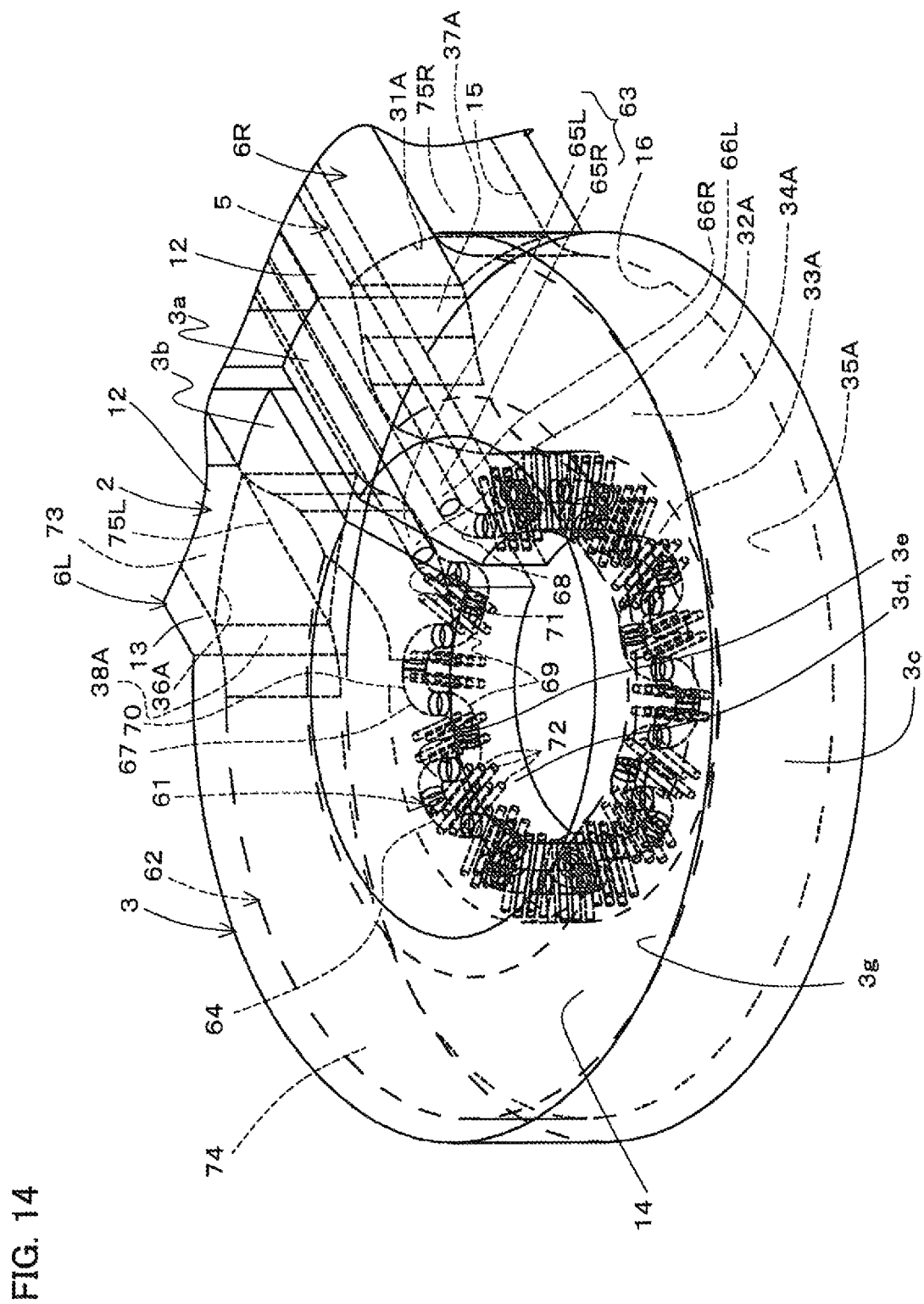
FIG. 14 is an enlarged perspective view of a coil section of FIG. 13.
Figure 15:
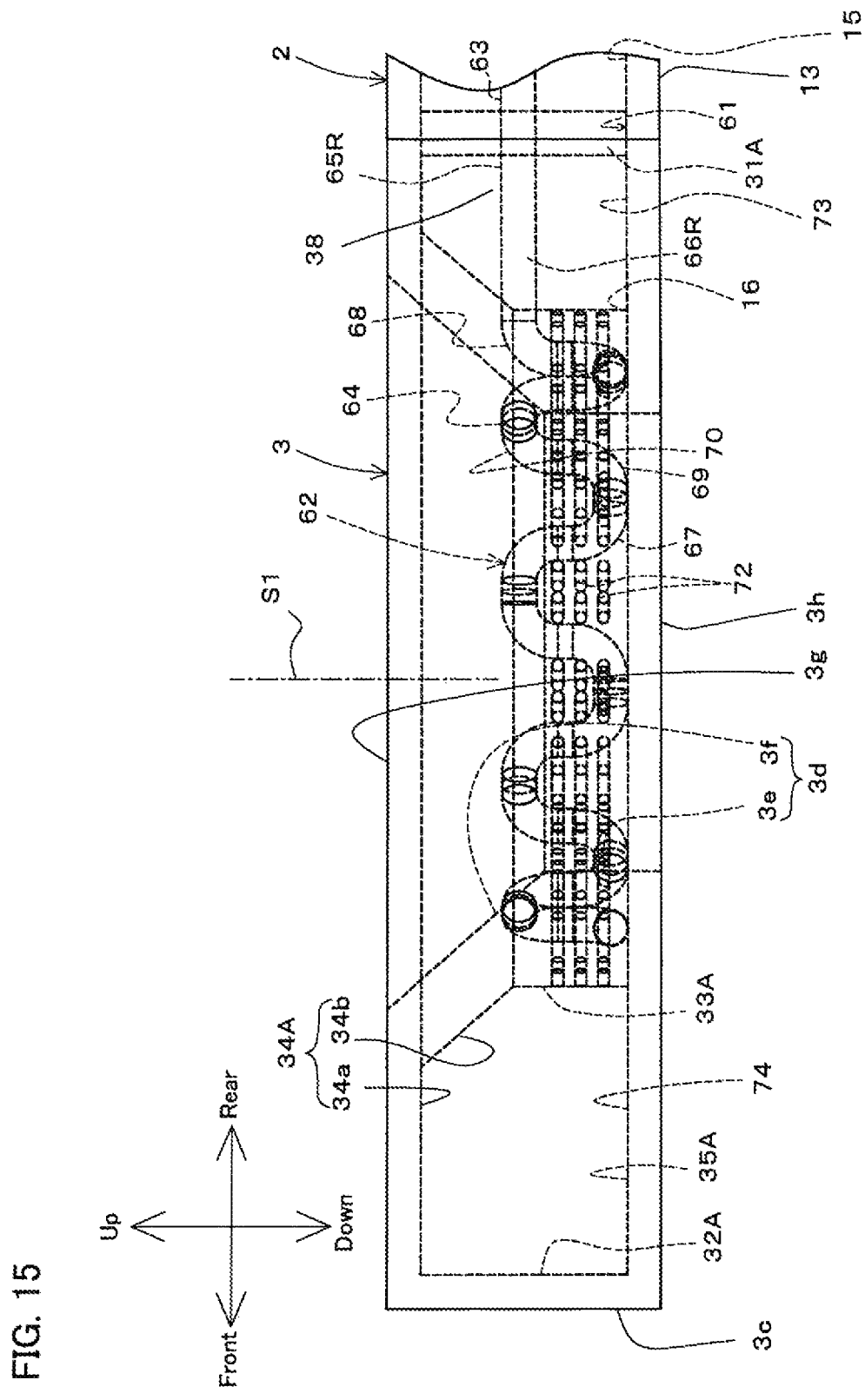
FIG. 15 is a side view of the coil section.
Figure 16:
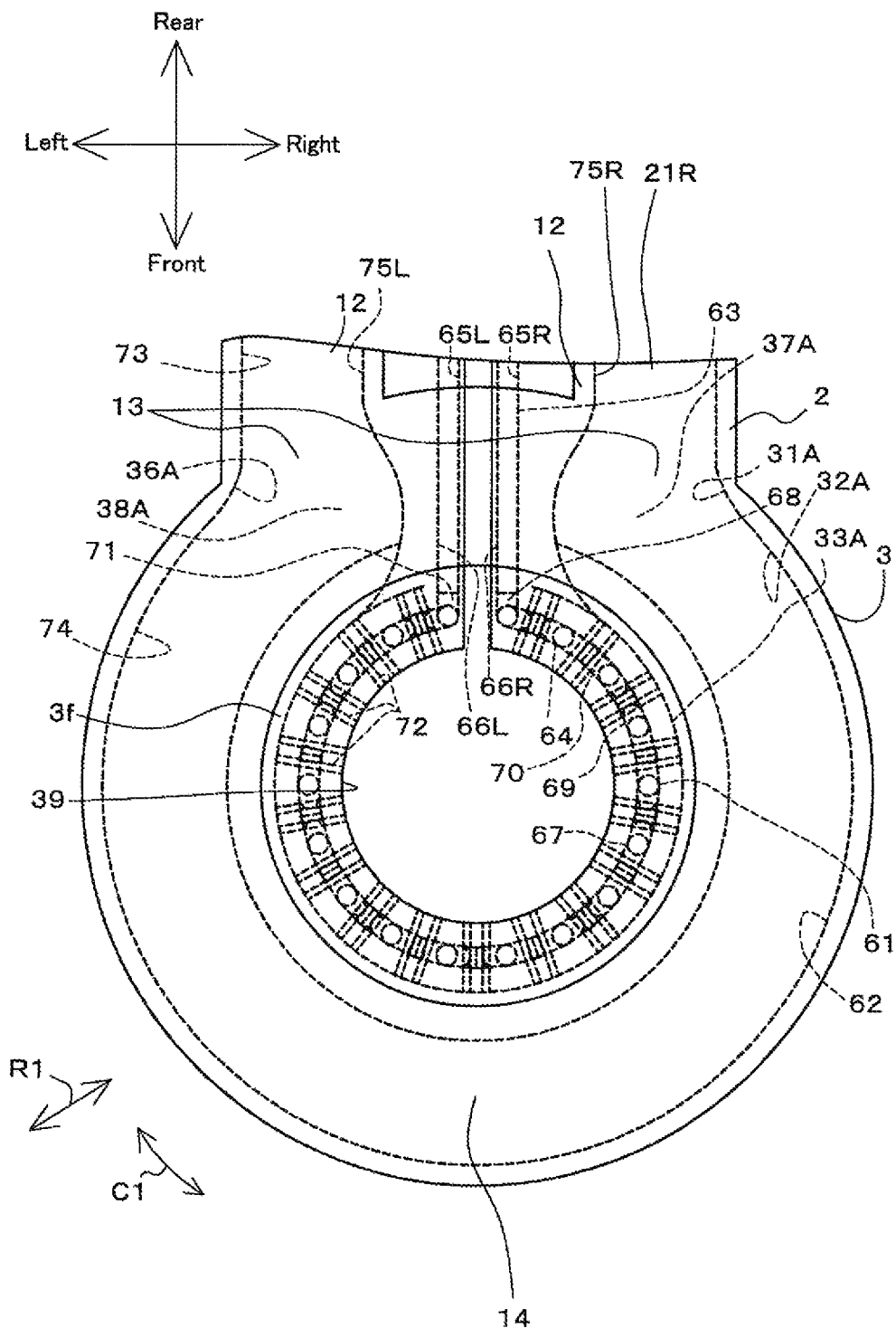
FIG. 16 is a plan view of the coil section.

FIG. 13 is a perspective view of an induction heating coil 1A according to a second embodiment of the present invention. FIG. 14 is an enlarged perspective view showing the coil section 3 of the FIG. 13. FIG. 15 is a side view of the coil section 3. FIG. 16 is a plan view of the coil section 3. Note that the following will mainly describe configurations different from those of the first embodiment, and the similar reference numerals are given to the similar configurations as in the first embodiment and descriptions thereof are omitted.

Referring to FIGS. 13 to 16, the induction heating coil 1A includes the power supply section 2, the coil section 3, the insulator 4, a cooling water passage 61, and a second cooling water passage 62. The constituent components of the induction heating coil 1A other than the insulator 4 are formed using the metal additive fabrication method.

The cooling water passage 61 is provided as a water passage through which cooling water for cooling the coil section 3 passes. In the present embodiment, the cooling water enters the induction heating coil 1A from the power supply section 2, passes through the coil section 3, then returns to the power supply section 2, and is discharged from the power supply section 2 to the outside of the induction heating coil 1A. In the present embodiment, the cooling water passage 61 has a uniform cross-sectional shape. That is, the cross-sectional shape of the cooling water passage 61 that is orthogonal to the traveling direction F1 is constant at any position in the traveling direction F1. In the present embodiment, the cross-sectional shape of the cooling water passage 61 is round and substantially truly circular.

The cooling water passage 61 includes a power supply section side water passage 63 and a coil section side water passage 64.

The power supply section side water passage 63 is a water passage formed in the power supply section 2, and is configured to supply cooling water to the coil section side water passage 64 and to discharge the cooling water from the coil section side water passage 64.

The power supply section side water passage 63 includes a first water passage 65R formed in the first division 6R and a second water passage 65L formed in the second division 6L.

The first water passage 65R and the second water passage 65L form a bilaterally symmetrical shape. The first water passage 65R and the second water passage 65L are respectively formed below the corresponding ribs 9 of the lower wall portions 12 of the divisions 6R and 6L, and extend straight in the front-rear direction. The cross-sectional areas (areas of the cross-sections that are orthogonal to the traveling direction F1) of the water passages 65R and 65L are set to be smaller than the cross-sectional area (area of the cross-section that is orthogonal to the traveling direction F1) of a power supply section side second water passage 73, which will be described later, of the second cooling water passage 62.

The first water passage 65R and the second water passage 65L are respectively open to the rear of the corresponding rear walls 7, and connected to a first straight section 66R and a second straight section 66L of the coil section side water passage 64.

The coil section side water passage 64 includes the first straight section 66R, the second straight section 66L, and a rising and falling section 67.

The first straight section 66R is a section that is contiguous to the first water passage 65R of the power supply section side water passage 15, and extends in a straight line in which the first water passage 65R extends. The first straight section 66R is connected to the rising and falling section 67 below the tapered surface 3f of the inner circumferential surface 3d of the coil section 3.

The second straight section 66L is a section that is contiguous to the second water passage 65L of the power supply section side water passage 15, and extends in a straight line in which the second water passage 65L extends. The second straight section 66L is connected to the rising and falling section 67 below the tapered surface 3f of the inner circumferential surface 3d of the coil section 3.

The rising and falling section 67 is formed as a meandering section that rises and falls in the up-down direction (thickness direction of the coil section 3) while extending in the circumferential direction C1. The rising and falling section 67 is arranged adjacent to the inner circumferential surface 3d of the coil section 3, and is configured to be able to cool the region near the inner circumferential surface 3d, which generates an especially large amount of heat, of the coil section 3. The rising and falling section 67 is located below the tapered surface 3f of the inner circumferential surface 3d of the coil section 3.

The rising and falling section 67 includes an inlet 68, a plurality of first arch sections 69, a plurality of second arch sections 70, and an outlet 71.

The inlet 68 is provided as a section that is connected to the first straight section 66R The inlet 68 is formed so as to extend inward in the radial direction and downward. The inlet 68 is connected to a first arch section 69.

In the present embodiment, the first arch sections 69 and the second arch sections 70 are arranged alternately in the circumferential direction C1, and the continuous shape of the first arch sections 69 and the second arch sections 70 forms the rising and falling section 67 that rises and falls in the up-down direction.

The first arch sections 69 are sections that are U-shaped when viewed in the radial direction R1 of the coil section 3. The first arch sections 69 are arranged near the lower end of the coil section 3. The second arch sections 70 are sections that are upside-down U-shaped when viewed in the radial direction R1 of the coil section 3. The second arch sections 70 are arranged in the intermediate section of the coil section 3 in the up-down direction, and are located above the first arch sections 69.

As described above, one end of a first arch section 69 is contiguous to the inlet 68. The other end of the first arch section 69 is contiguous to one end of a second arch section 70. Furthermore, the other end of this second arch section 70 is contiguous to one end of the next first arch section 69. Accordingly, the first arch sections 69 and the second arch sections 70 are connected to each other alternately in the circumferential direction C1. Also, a first arch section 69 is connected to the outlet 71 at the other end 3b of the coil section 3.

The outlet 71 is provided as a section that is connected to the second straight section 66L. The outlet 71 is formed so as to extend outward in the radial direction R1 and upward from the first arch section 69 at the other end 3b of the coil section 3. The second cooling water passage 62 is arranged adjacent to the cooling water passage 61 having the above-described configuration.

The second cooling water passage 62 is provided as a water passage through which treatment target cooling water (treatment target cooling medium) for cooling the treatment target 100 that is induction-heated by the coil section 3 passes. The second cooling water passage 62 is connected to spray nozzles 72, and the cooling water that has passed through the second cooling water passage 62 is sprayed onto the treatment target 100 from the spray nozzles 72. That is, after being heated by the induction heating coil 1A, the treatment target 100 is subjected to quenching processing or the like by cooling water being sprayed thereon from the spray nozzle 72.

The second cooling water passage 62 has the same shape as that of the cooling water passage 5 of the first embodiment. More specifically, the second cooling water passage 62 has the power supply section side second water passage 73, and a coil section side second water passage 74.

The power supply section side second water passage 73 is a water passage formed in the power supply section 2, and supplies cooling water to the coil section side second water passage 74.

The power supply section side second water passage 73 includes a first water passage 75R formed in the first division 6R, and a second water passage 75L formed in the second division 6L.

The first water passage 75R is provided as a passage for supplying cooling water to the coil section side second water passage 74. The shape of the first water passage 75R is the same as that of the first water passage 21R of the induction heating coil 1, and thus a detailed description thereof is omitted.

The second water passage 75L is provided as a passage for supplying cooling water to the coil section side second water passage 74. The shape of the second water passage 75L is the same as that of the second water passage 21L of the induction heating coil 1, and thus a detailed description thereof is omitted. The coil section side second water passage 74 is connected the first water passage 75R and the second water passage 75L that have the above-described configurations.

The coil section side second water passage 74 is provided for supplying cooling water to the spray nozzles 72. Furthermore, the coil section side second water passage 74 is configured to cool the coil section 3 in cooperation with the cooling water passage 61. The coil section side second water passage 74 is a water passage formed, as a whole, in the shape of an open circular ring with ends, and is formed around the central axis of the coil section 3. The coil section side second water passage 74 is arranged so as to surround the rising and falling section 67 of the cooling water passage 5. The shape of the coil section side second water passage 74 is the same as that of the coil section side water passage 16 of the cooling water passage 5 of the induction heating coil 1.

More specifically, the coil section side second water passage 74 includes an inlet 31A an outer circumferential surface 32A, an inner circumferential surface 33A, an upper surface 34A, a lower surface 35A, an outlet 36A, a first extended section 37A, and a second extended section 38A.

Also, the shapes of the inlet 31A, the outer circumferential surface 32A, the inner circumferential surface 33A, the upper surface 34A, the lower surface 35A, the outlet 36A, the first extended section 37A, and the second extended section 38A are the same as the respective shapes of the corresponding inlet 31, outer circumferential surface 32, inner circumferential surface 33, upper surface 34, lower surface 35, outlet 36, first extended section 37, and second extended section 38 of the induction heating coil 1 according to the first embodiment.

In the second cooling water passage 62 having the above-described configuration, the cooling water from the power supply section side second water passage 73 flows toward the coil section side second water passage 74, and then flows from the coil section side second water passage 74 to the spray nozzles 72.

The spray nozzles 72 are open toward the portions where the coil section 3 is opposite to the treatment target 100 during the heat treatment of the treatment target 100, and spray the treatment target cooling water onto the treatment target 100.

The plurality of spray nozzles 72 are formed in the circumferential direction C1 and the up-down direction (thickness direction of the coil section 3). In the present embodiment, each spray nozzle 72 extends in the radial direction R1 from the coil section side second water passage 74 to the inner circumferential surface 3d of the coil section 3, and is open to this inner circumferential surface 3d. The spray nozzle 72 forms a columnar space. The spray nozzles 72 are equally spaced in the up-down direction and the circumferential direction C1.

Some spray nozzles 72 are formed in the shape of a cylinder that is arranged so as not to be in contact with the rising and falling section 67 of the cooling water passage 61. Furthermore, some spray nozzles 72 are formed in the shape of a cylinder that extends so as to pass through the rising and falling section 67.

As described above, according to the second embodiment, the rising and falling section 67 of the cooling water passage 61 extends so as to rise and fall in the thickness direction of the coil section 3 while extending in the circumferential direction C1. According to this configuration, a larger contact area between the coil section 3 and the cooling water can be ensured. Accordingly, it is possible to absorb the heat generated by the coil section 3 with a cooling medium more efficiently, making it possible to more reliably suppress imbalance in heat stress due to overheating by the coil section 3. Furthermore, the thin (small) cooling water passage 61 can be achieved. The ease of the manufacturing of the induction heating coil 1A including the cooling water passage 61 having such a complicated three-dimensional shape will become significant by the use of the additive fabrication method.

Furthermore, according to the second embodiment, the spray nozzles 72 are capable of spraying treatment target cooling water onto the treatment target 100. According to this configuration, the treatment target 100 that was heated through induction heating by the coil section 3 can be cooled with the treatment target cooling water. Accordingly, the ease of manufacturing of the induction heating coil 1A, which includes the second cooling water passage 62 in addition to the cooling water passage 61, will become significant by the use of the additive fabrication method.

Although the embodiments of the present invention have been described, the scope of the present invention intends to encompass, of course, all modifications, applications, and the equivalents of the features according to the claims from which the modifications and the applications will become clarified by reading and understanding the specification. For example, the present invention may also be modified and implemented as follows.

(1) In the above-described embodiments, description was given taking, for example, a configuration in which the coil section 3 has the shape of an open circular ring with ends as an example. However, the present invention is not limited to this. The coil section 3 may have any shape that is capable of induction-heating the treatment target 100, and may have, for example, a shape having a curved section, U-shape, or a spiral shape. Furthermore, the coil section may have the shape in which a plurality of rings are aligned in the axial direction of the coil section 3 (shape with a plurality of turns).

Figure 17:
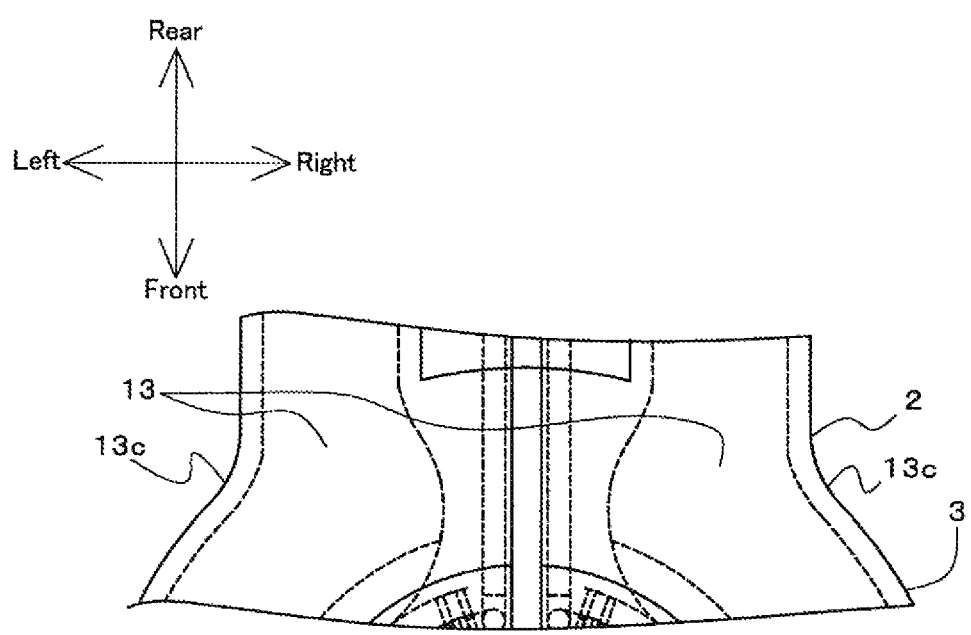
FIG. 17 is a plan view of main constituent components illustrating another modification.

(2) Furthermore, although, in the above-described embodiments, two ends in the circumferential direction C1 of the connection section 13 at which the power supply section 2 and the coil section 3 are connected to each other are provided as being step-like when viewed in a plan view, the present invention is not limited to this. For example, as shown in FIG. 17, the connection section 13 may also be formed in a shape in which its cross-sectional area increases continuously toward the heating coil section 3. In this case, the outer side surface 13c of the connection section 13 is formed in a smooth arc shape, and stress concentration due to heat stress is even less likely to occur.

(3) Furthermore, in the above-described embodiments, description was given taking the configuration in which the power supply section 2 of the induction heating coil 1 does not include the support section 50 as an example. However, the present invention is not limited to this. For example, in the case where the power supply section 2 and coil section 3 are oriented horizontally at the time of completion, a support section 50B may be placed below the power supply section 2 as well.

Figure 18A:
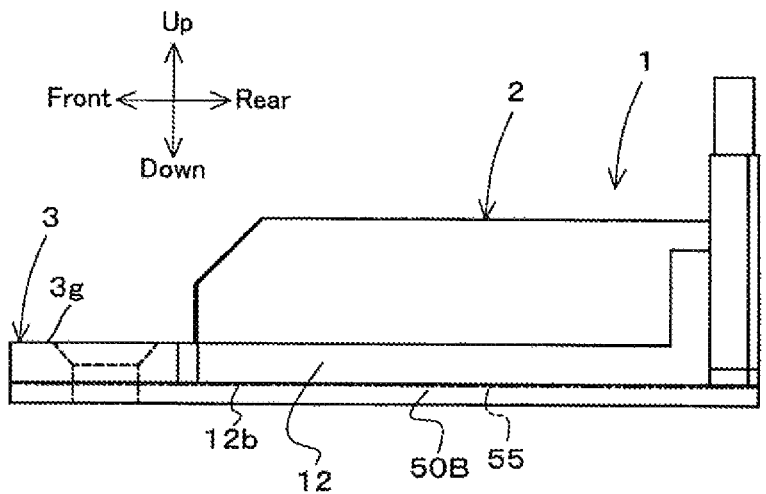
FIG. 18A is a diagram of main constituent components of a power supply section and a coil section (horizontal orientation type) in a manufacturing process according to a yet another modification, showing the state before a support section is removed.
Figure 18B:
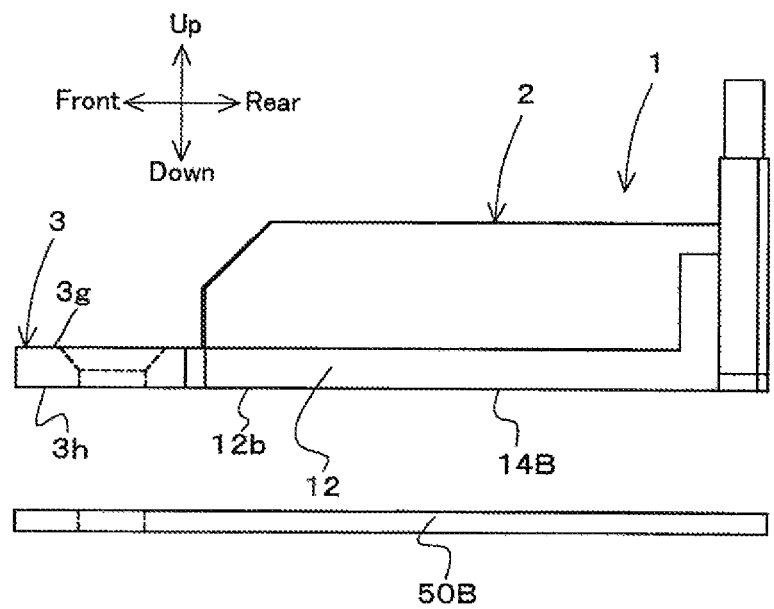
FIG. 18B is a diagram of main constituent components of a power supply section and a coil section (horizontal orientation type) in a manufacturing process according to a yet another modification, showing the state after a support section has been removed.

As shown in FIG. 18A, in the case where the power supply section 2 and the coil section 3 are formed in a horizontal orientation, the power supply section 2 and the coil section 3 are formed together with the support section 50B. The support section 50B is plate-shaped below the power supply section 2 and the coil section 3. In the post-treatment process, cutting is performed at a border 55 that is indicated, in FIG. 18A, by a virtual line, that is, a two-dot chain line between the support section 50B and the power supply section 2 and coil section 3. Accordingly, as shown in FIG. 18B, the support section 50B is removed from the power supply section 2 and the coil section 3. A post-removal section 14B is formed on the section corresponding to this border 55. The border 55 is located at the lower end surface 12b of the lower wall portion 12 and the lower end surface 3h of the coil section 3.

Figure 19A:
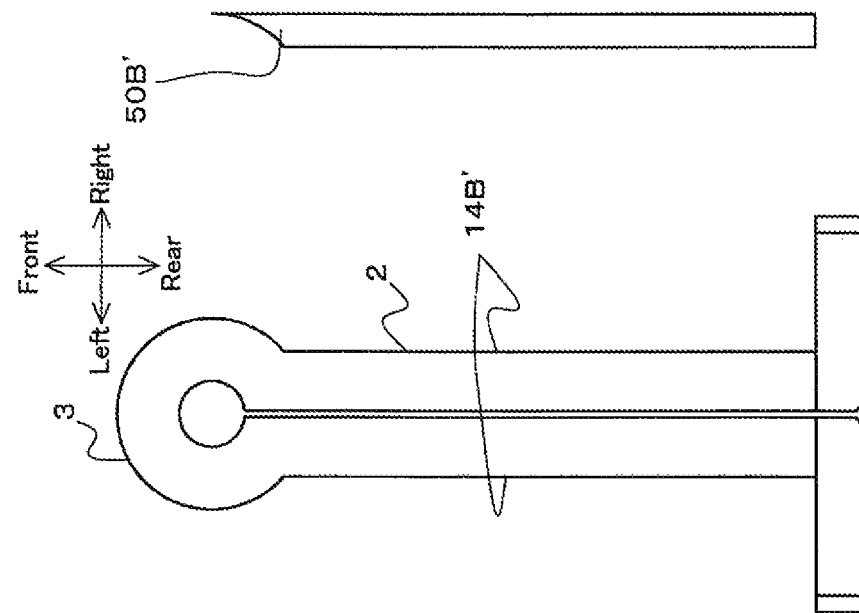
FIG. 19A is a diagram of main constituent components of a power supply section and a coil section (vertical orientation type) in a manufacturing process according to a yet another modification, showing the state before a support section is removed.
Figure 19B:
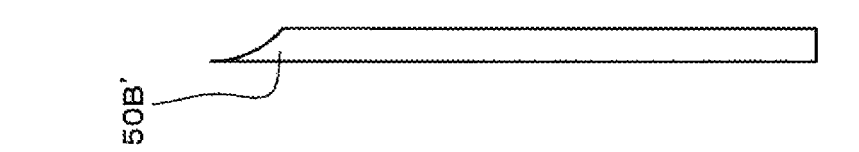
FIG. 19B is a diagram of main constituent components of a power supply section and a coil section (vertical orientation type) in a manufacturing process according to a yet another modification, showing the state after a support section has been removed.
Figure 19B:
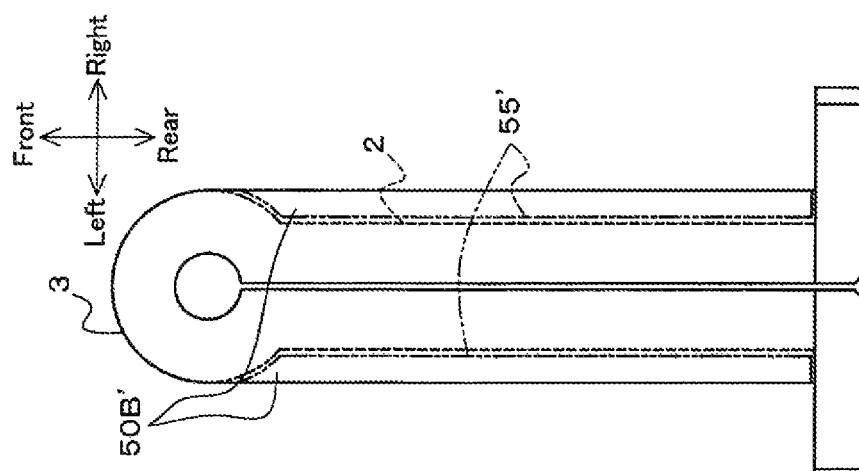

On the other hand, as show in the bottom view of FIG. 19A, in the case where the power supply section 2 and the coil section 3 are formed in a vertical orientation, the power supply section 2 and the coil section 3 are formed, together with support sections 50B', in a vertical orientation. The support sections 50B' are formed so as to fill up the hollow section behind the coil section 3 (below the coil section 3 in FIG. 19A). That is, the support sections 50B' are formed in a vertical orientation at positions located below the coil section 3, and support the coil section 3. Also, in the post-treatment process, cutting is performed at borders 55' that are indicated, in FIG. 19A, by virtual lines, that is, two-dot chain lines between the support sections 50B' and the power supply section 2 and coil section 3. Accordingly, as shown in FIG. 19B, the support sections 50B' are removed from the power supply section 2 and the coil section 3. Post-removal section 14B' are formed at positions that correspond to the borders 55' of the coil section 3. Each border 55' is located on a side surface of the corresponding lower wall portion 12 of the power supply section 2 and on the rear surface of the coil section 3.

INDUSTRIAL APPLICABILITY

The present invention is widely applicable to an induction heating coil and a method for manufacturing the induction heating coil.

What is claimed is:

1. An induction heating coil comprising:
a coil configured to heat a treatment target by induction;
a power supply configured to supply power to the coil; and
a first cooling medium passage configured to supply a cooling medium to the coil for cooling the coil; and
a second cooling medium passage configured to supply a treatment target cooling medium for cooling the treatment target induction-heated by the coil,
wherein the first cooling medium passage includes a coil side first passage formed in the coil,
the second cooling medium passage includes a coil side second passage formed in the coil,
the coil side first passage is arranged inwardly in a radial direction of the coil with respect to the coil side second passage,
the coil, the coil side first passage and the coil side second passage are formed in one piece using a single member of unified structure,
the coil includes an upper end surface and a lower end surface as end surfaces facing each other in a thickness direction of the coil,
the coil side first passage includes an arch section,
the arch section is formed in a U shape that advances to one side of the upper end surface and the lower end surface and then advances to an other side along a circumferential direction of the coil,
the coil side second passage is arranged so as to surround the coil side first passage,
the induction heating coil further comprises a spray nozzle configured to spray the treatment target cooling medium to the treatment target and to be connected to the coil side second passage and to be opened to an inner circumferential surface of the coil, and
the injection nozzle is arranged so as to avoid the coil side first passage by passing through a portion of the coil surrounded by the U shape of the arch section.

2. The induction heating coil according to claim 1, wherein:
the coil, the power supply, the first cooling medium passage and the second cooling medium passage are formed using a metal additive fabrication method.

3. The induction heating coil according to claim 2, wherein:
a support configured to support a predetermined portion of the induction heating coil is formed when the induction heating coil is formed by the metal additive fabrication method, and
the induction heating coil has a post-removal portion that remains after the support has been removed.

4. The induction heating coil according to claim 3, wherein:
the coil has a height that is smaller than that of the power supply, and is formed in a shape projecting from the power supply, and
the support is formed so as to support the coil that serves as the predetermined portion when the induction heating coil is formed by the metal additive fabrication method.

5. The induction heating coil according to claim 1, wherein:
the second cooling medium passage further includes a power supply side second passage formed in the power supply, and a connection conduit arranged between the power supply side second passage and the coil side second passage and connecting the power supply side second passage and the coil side second passage to each other, and the connection conduit has a shape such that angles from the portion of the coil being orthogonal that increase and decrease along a travel path of the treatment target cooling medium increases and then decreases along a circumferential direction of the coil in the traveling direction of the treatment target cooling medium.

6. The induction heating coil according to claim 1, wherein:

the coil, the power supply, the first cooling medium passage and the second cooling medium passage are formed in one piece using a single member of unified structure.

7. The induction heating coil according to claim 1, wherein:

the coil has the upper end surface arranged at one end in the axial direction of the coil and a tapered surface which is continuous with an inner peripheral portion of the upper end surface and decreases its diameter from the inner peripheral portion toward one side of the axial direction, the coil side first passage is arranged at a position facing the tapered surface in the axial direction, the upper end surface of the coil is formed into a flat surface orthogonal to the axial direction of the coil, and the coil side second passage is arranged from a position facing the tapered surface in the axial direction to a position facing the upper end surface in the axial direction.

8. The induction heating coil according to claim 7, wherein:

the lower end surface of the coil is a flat surface, in the axial direction of the coil, the distance from the lower end surface to the coil side first passage and the distance from the lower end surface to the coil side second passage are set to be the same, and in the axial direction of the coil, the distance from the upper end surface to the coil side second passage is set shorter than the distance from the upper end surface to the coil side first passage.

* * * * *